United States Patent
Tsuji

(10) Patent No.: US 12,124,748 B2
(45) Date of Patent: *Oct. 22, 2024

(54) TERMINAL DEVICE, ACCESS POINT, COMMUNICATION DEVICE, AND COMPUTER PROGRAMS THEREFOR

(71) Applicant: Brother Kogyo Kabushiki Kaisha, Nagoya (JP)

(72) Inventor: Ryoya Tsuji, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,233

(22) Filed: Apr. 7, 2023

(65) Prior Publication Data

US 2023/0289116 A1  Sep. 14, 2023

Related U.S. Application Data

(63) Continuation of application No. 17/531,872, filed on Nov. 22, 2021, now Pat. No. 11,630,619, which is a
(Continued)

(30) Foreign Application Priority Data

Mar. 30, 2018 (JP) ................................. 2018-068822

(51) Int. Cl.
*G06F 3/12* (2006.01)
*H04L 9/30* (2006.01)
(Continued)

(52) U.S. Cl.
CPC .......... *G06F 3/1236* (2013.01); *G06F 3/1222* (2013.01); *G06F 3/1238* (2013.01);
(Continued)

(58) Field of Classification Search
CPC .... G06F 3/1236; G06F 3/1222; G06F 3/1238; G06F 3/1292; H04L 9/30; H04L 63/0442;
(Continued)

(56) References Cited

U.S. PATENT DOCUMENTS 4,723,284 A    2/1988  Munck et al.
9,430,661 B2 *  8/2016  Toyoda ................. G06F 21/606
(Continued)

FOREIGN PATENT DOCUMENTS

CN    102047266 A    5/2011
CN    103828443 A    5/2014
(Continued)

OTHER PUBLICATIONS

Sep. 6, 2023—(CN) First Office Action—CN App 201910251088.7, Eng Tran.
(Continued)

*Primary Examiner* — Neil R McLean
(74) *Attorney, Agent, or Firm* — Banner & Witcoff, Ltd.

(57) ABSTRACT

A terminal device (e.g., a smartphone) may use a private key to generate a first configuration object used for establishing a first wireless connection between the terminal device and an access point. The terminal device may also use the private key to generate a second configuration object used for establishing a second wireless connection between a communication device (e.g., a printer) and the access point. The terminal device may then transmit specific data (e.g., print data) to the communication device via the access point.

8 Claims, 11 Drawing Sheets

Related U.S. Application Data continuation of application No. 16/798,663, filed on Feb. 24, 2020, now Pat. No. 11,200,012, which is a continuation of application No. 16/371,496, filed on Apr. 1, 2019, now Pat. No. 10,613,805.

(51) Int. Cl.
*H04L 9/40* (2022.01)
*H04W 12/0431* (2021.01)
*H04W 12/50* (2021.01)
*H04W 76/15* (2018.01)
*H04W 12/06* (2021.01)
*H04W 12/77* (2021.01)
*H04W 84/12* (2009.01)

(52) U.S. Cl.
CPC ............ *H04L 9/30* (2013.01); *H04L 63/0442* (2013.01); *H04L 63/0853* (2013.01); *H04W 12/0431* (2021.01); *H04W 12/50* (2021.01); *H04W 76/15* (2018.02); *G06F 3/1292* (2013.01); *H04W 12/06* (2013.01); *H04W 12/77* (2021.01); *H04W 84/12* (2013.01)

(58) Field of Classification Search
CPC .......... H04L 63/0853; H04W 12/0431; H04W 12/50; H04W 76/15; H04W 12/06; H04W 12/77; H04W 84/12; H04W 12/03; H04W 76/10
USPC ........................................................ 358/1.14
See application file for complete search history.

(56) References Cited

U.S. PATENT DOCUMENTS

| | | |
|---|---|---|
| 2008/0024591 A1 | 1/2008 | Doi et al. |
| 2011/0072266 A1 | 3/2011 | Takayama et al. |
| 2012/0076069 A1 | 3/2012 | Ogura |
| 2013/0027741 A1 | 1/2013 | Liu |
| 2013/0067068 A1 | 3/2013 | Hassan et al. |
| 2013/0070644 A1 | 3/2013 | McCann et al. |
| 2014/0286242 A1 | 9/2014 | McCann et al. |
| 2014/0369232 A1 | 12/2014 | Kim et al. |
| 2015/0087278 A1 | 3/2015 | Kim et al. |
| 2015/0089624 A1 | 3/2015 | Kim et al. |
| 2015/0189023 A1 | 7/2015 | Kubota et al. |
| 2015/0189489 A1 | 7/2015 | Banno |
| 2015/0229475 A1 | 8/2015 | Benoit et al. |
| 2016/0054962 A1 | 2/2016 | Park |
| 2016/0192429 A1 | 6/2016 | Nogawa |
| 2016/0234213 A1 | 8/2016 | Kim et al. |
| 2017/0024596 A1 | 1/2017 | Goto |
| 2017/0026833 A1 | 1/2017 | Goto |
| 2017/0026900 A1 | 1/2017 | Goto |
| 2017/0031646 A1* | 2/2017 | Imai ..................... G06F 3/1454 |
| 2017/0064756 A1 | 3/2017 | Abe |
| 2017/0086237 A1 | 3/2017 | Ando |
| 2017/0094451 A1 | 3/2017 | Terashita |
| 2017/0156110 A1 | 6/2017 | Ueno et al. |
| 2017/0202035 A1 | 7/2017 | Yokoyama et al. |
| 2017/0215066 A1 | 7/2017 | Tachibana |
| 2017/0215067 A1* | 7/2017 | Goto ..................... H04W 12/06 |
| 2017/0215069 A1 | 7/2017 | Nakajima |
| 2017/0215070 A1 | 7/2017 | Sakai |
| 2017/0250835 A1 | 8/2017 | Kim et al. |
| 2017/0295448 A1 | 10/2017 | McCann et al. |
| 2017/0339548 A1 | 11/2017 | Moriya |
| 2017/0339734 A1 | 11/2017 | Sambe |
| 2018/0020353 A1 | 1/2018 | Bhandaru et al. |
| 2018/0042058 A1 | 2/2018 | McCann et al. |
| 2018/0069718 A1 | 3/2018 | Terao |
| 2018/0069851 A1 | 3/2018 | Terao |
| 2018/0077255 A1 | 3/2018 | Goto |
| 2018/0083795 A1 | 3/2018 | Zehler et al. |
| 2018/0124769 A1 | 5/2018 | Takahashi |
| 2018/0145961 A1 | 5/2018 | Azuma |
| 2018/0167283 A1 | 6/2018 | Moritomo |
| 2018/0248694 A1 | 8/2018 | Benoit et al. |
| 2018/0302792 A1 | 10/2018 | Zhang et al. |
| 2019/0159114 A1 | 5/2019 | McCann et al. |
| 2019/0166124 A1 | 5/2019 | Kim et al. |
| 2019/0196761 A1 | 6/2019 | Minakawa et al. |
| 2019/0215878 A1 | 7/2019 | Goto |
| 2019/0230613 A1 | 7/2019 | Kim et al. |
| 2019/0239036 A1 | 8/2019 | Morimoto |
| 2019/0274048 A1 | 9/2019 | Yamaki |
| 2019/0394744 A1 | 12/2019 | Kim et al. |
| 2020/0015084 A1 | 1/2020 | Sakai |
| 2021/0224495 A1 | 7/2021 | Nakajima |
| 2022/0015161 A1 | 1/2022 | Goto |
| 2022/0053414 A1 | 2/2022 | McCann et al. |
| 2023/0099038 A1 | 3/2023 | Kim et al. |

FOREIGN PATENT DOCUMENTS

| | | |
|---|---|---|
| CN | 105453671 A | 3/2016 |
| CN | 105580310 A | 5/2016 |
| CN | 105898830 A | 8/2016 |
| CN | 105981031 A | 9/2016 |
| CN | 106255176 A | 12/2016 |
| CN | 107094294 A | 8/2017 |
| CN | 107533601 A | 1/2018 |
| CN | 107592629 A | 1/2018 |
| EP | 1841260 A2 | 10/2007 |
| EP | 2536245 A2 | 12/2012 |
| JP | 2013-074578 A | 4/2013 |
| JP | 2016-140001 A | 8/2016 |
| JP | 2016-178687 A | 10/2016 |
| JP | 2017-28454 A | 2/2017 |
| JP | 2017-028461 A | 2/2017 |
| JP | 2017-050612 A | 3/2017 |
| JP | 2017-513265 A | 5/2017 |
| JP | 2017-135517 A | 8/2017 |
| JP | 2017-135519 A | 8/2017 |
| JP | 2017-135520 A | 8/2017 |
| JP | 2018-37978 A | 3/2018 |
| JP | 2018-37979 A | 3/2018 |
| JP | 2018-042058 A | 3/2018 |
| WO | 2015/195978 A1 | 12/2015 |
| WO | 2018/047653 A1 | 3/2018 |

OTHER PUBLICATIONS

Sep. 5, 2023—(CN) First Office Action—CN App 201910249680.3, Eng Tran.
"Device Provisioning Protocol Technical Specification Version 0.2.11" Wi-Fi Alliance Proprietary, 2017 Wi-Fi Alliance, pp. 1-133.
"Device Provisioning Protocol Specification Version 1.1" Wi-Fi Alliance Proprietary, 2018 Wi-Fi Alliance, pp. 1-124.
"Device Provisioning Protocol Specification Version 1.0" Wi-Fi Alliance Proprietary, 2018 Wi-Fi Alliance, pp. 1-124.
"Wi-Fi Device Provisioning Protocol (DPP) Technical Specification Version 0.0.23" Wi-Fi Alliance 2016, pp. 1-90.
Aug. 7, 2019—Extended European Search Report—App 19165575.2.
Aug. 6, 2019—Extended European Search Report—App 19165572.9.
Sep. 30, 2019—(US) Non-final Office Action—U.S. Appl. No. 16/371,453.
Feb. 18, 2020—(US) Non-final Office Action—U.S. Appl. No. 16/371,453.
Jun. 17, 2020—(US) Final Office Action—U.S. Appl. No. 16/371,453.
Jan. 1, 2021—(US) Non-final Office Action—U.S. Appl. No. 16/371,453.
Mar. 15, 2021—(EP) Examination Communication—App 19165572.9.
Jul. 19, 2021—Notice of Allowance—U.S. Appl. No. 16/371,453.
Mar. 8, 2022—(JP) Notice of Reasons for Refusal—App 2018-068823, Eng Tran.
Feb. 2, 2023—(US)—Notce of Allowance—U.S. Appl. No. 17/681,360.

(56) References Cited

OTHER PUBLICATIONS

Aug. 10, 2023—(US) Non-final Office Action—U.S. Appl. No. 18/145,292.
Jul. 2, 20243—(JP) Office Action—JP App 2023-101724, Eng tran.

* cited by examiner (NETWORK ACCESS WITH AP)

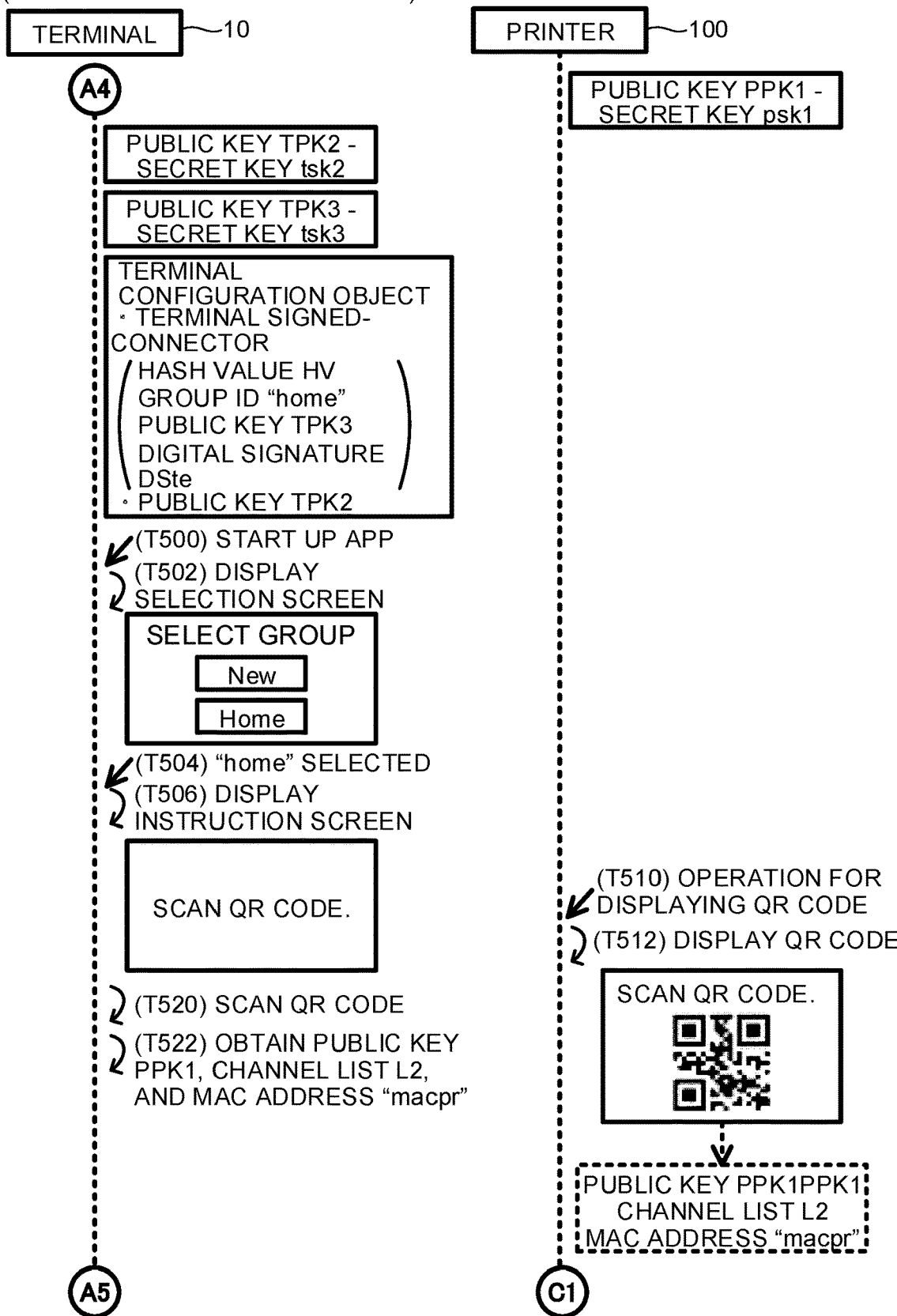

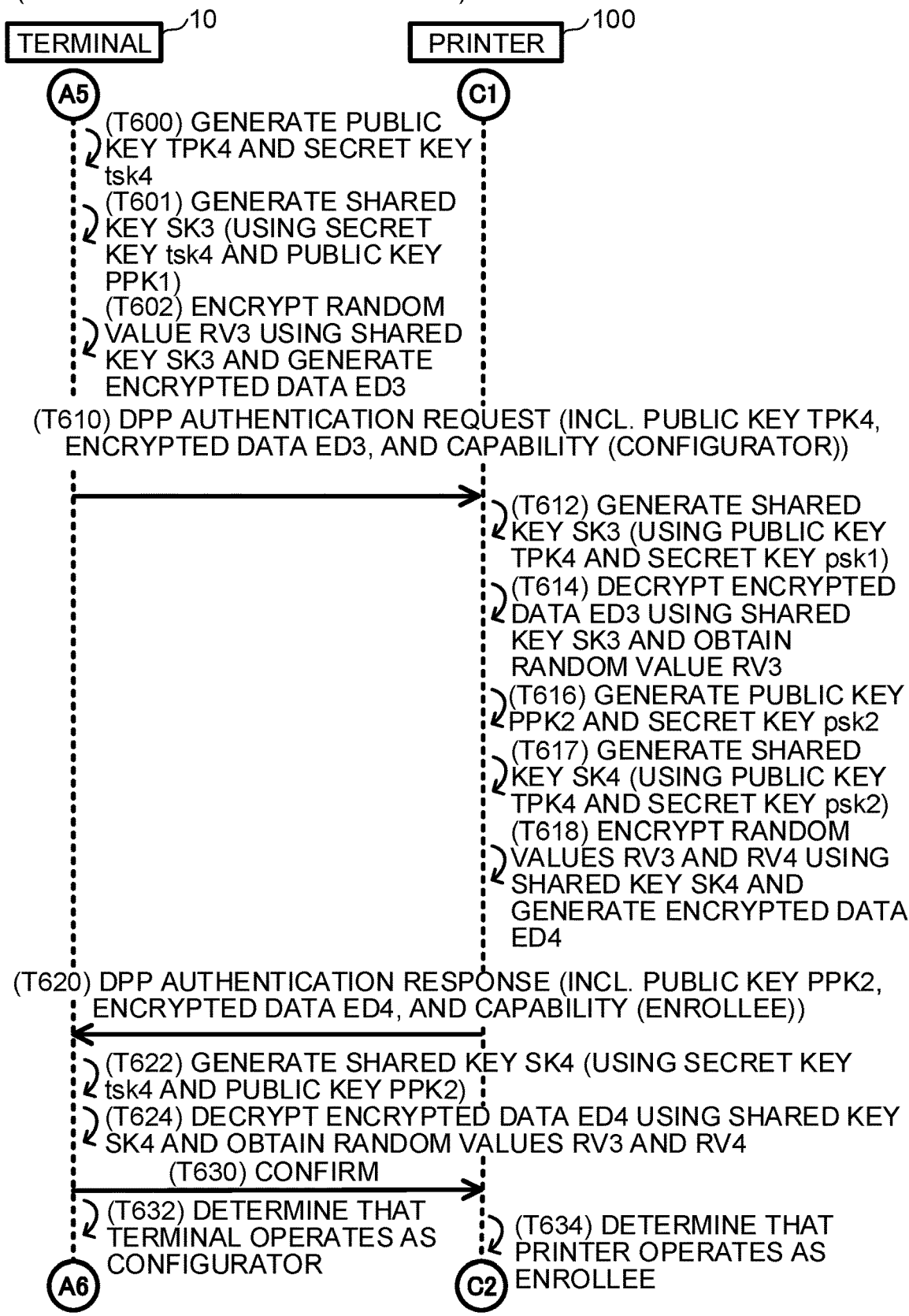

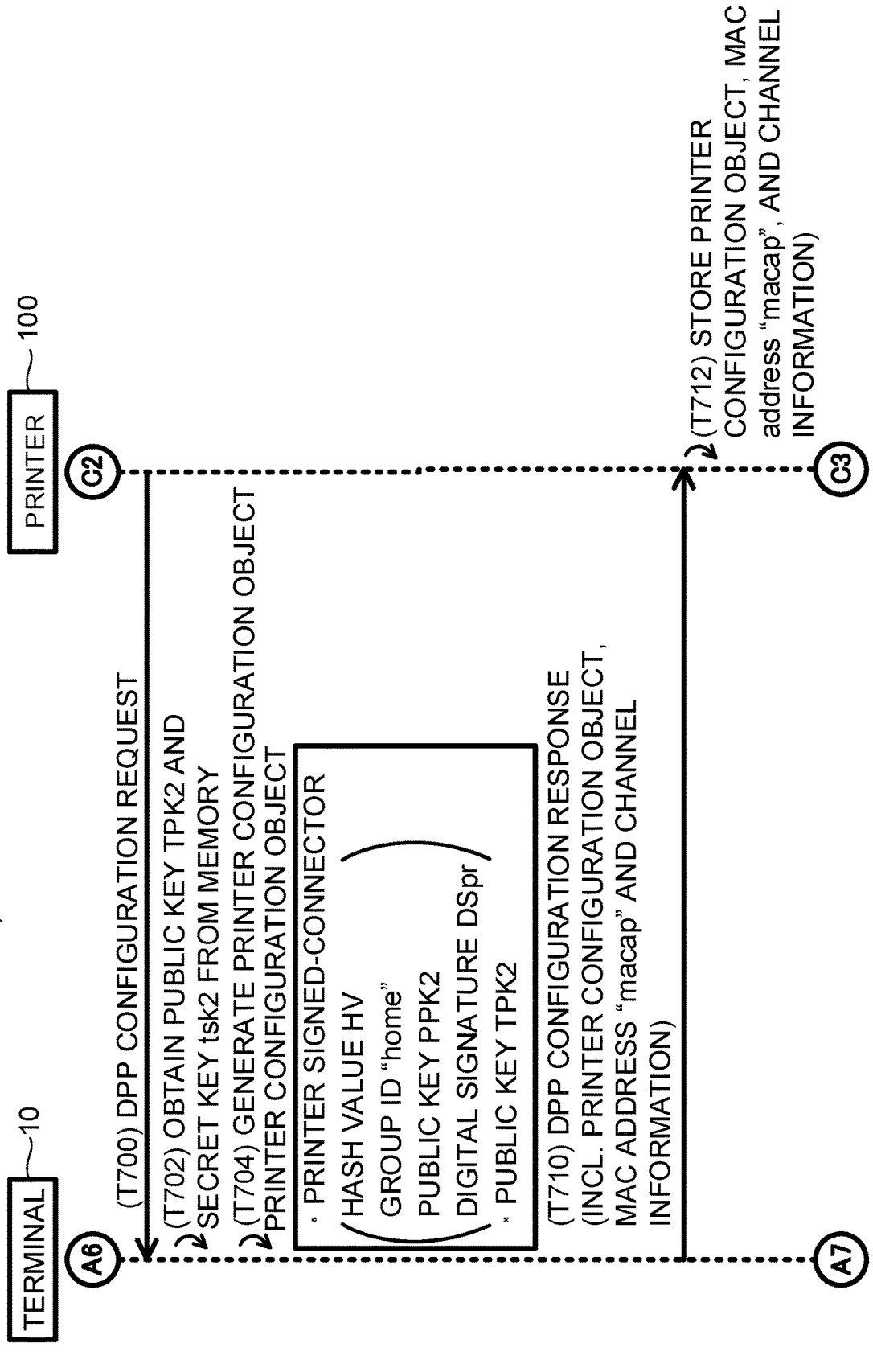

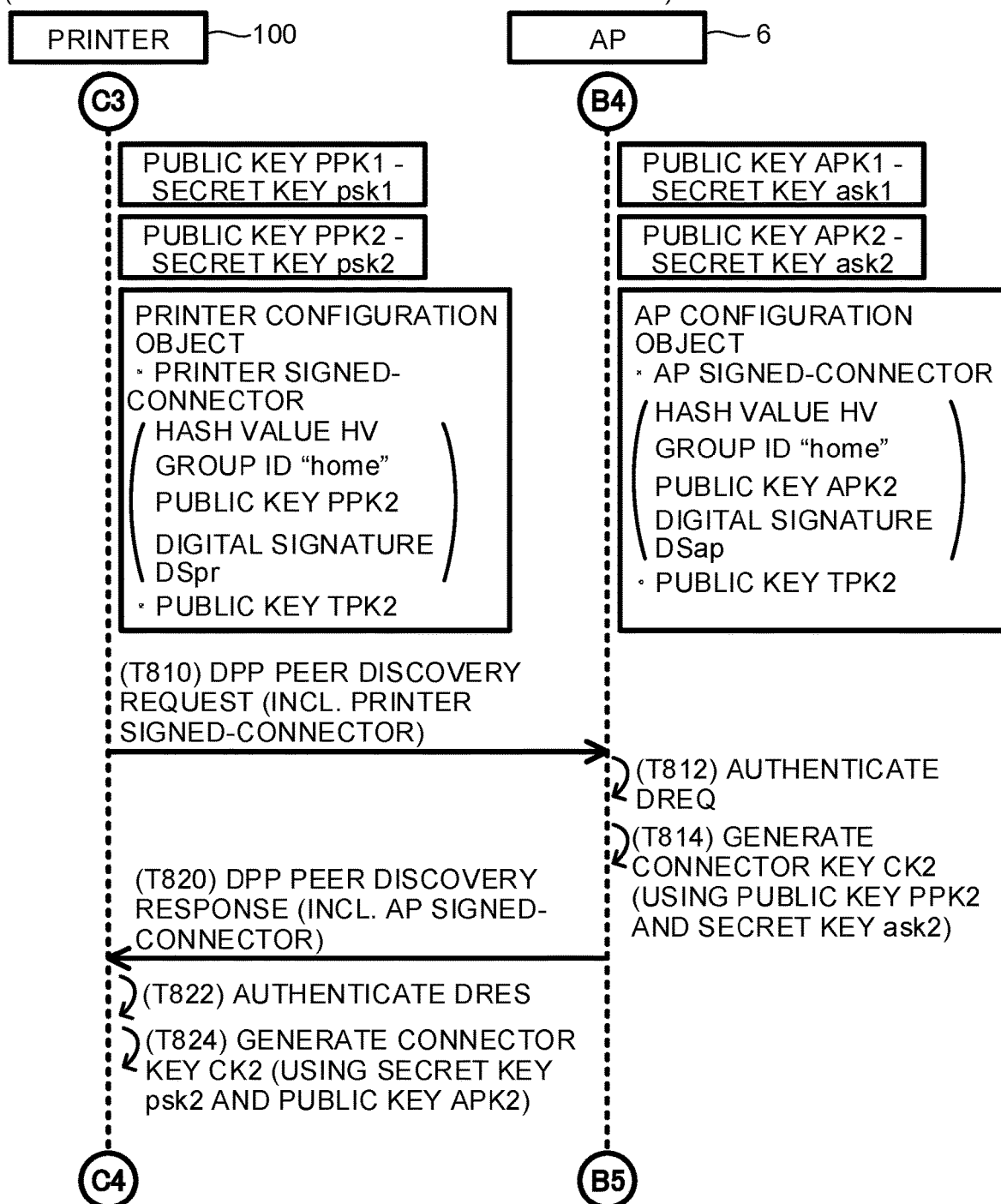

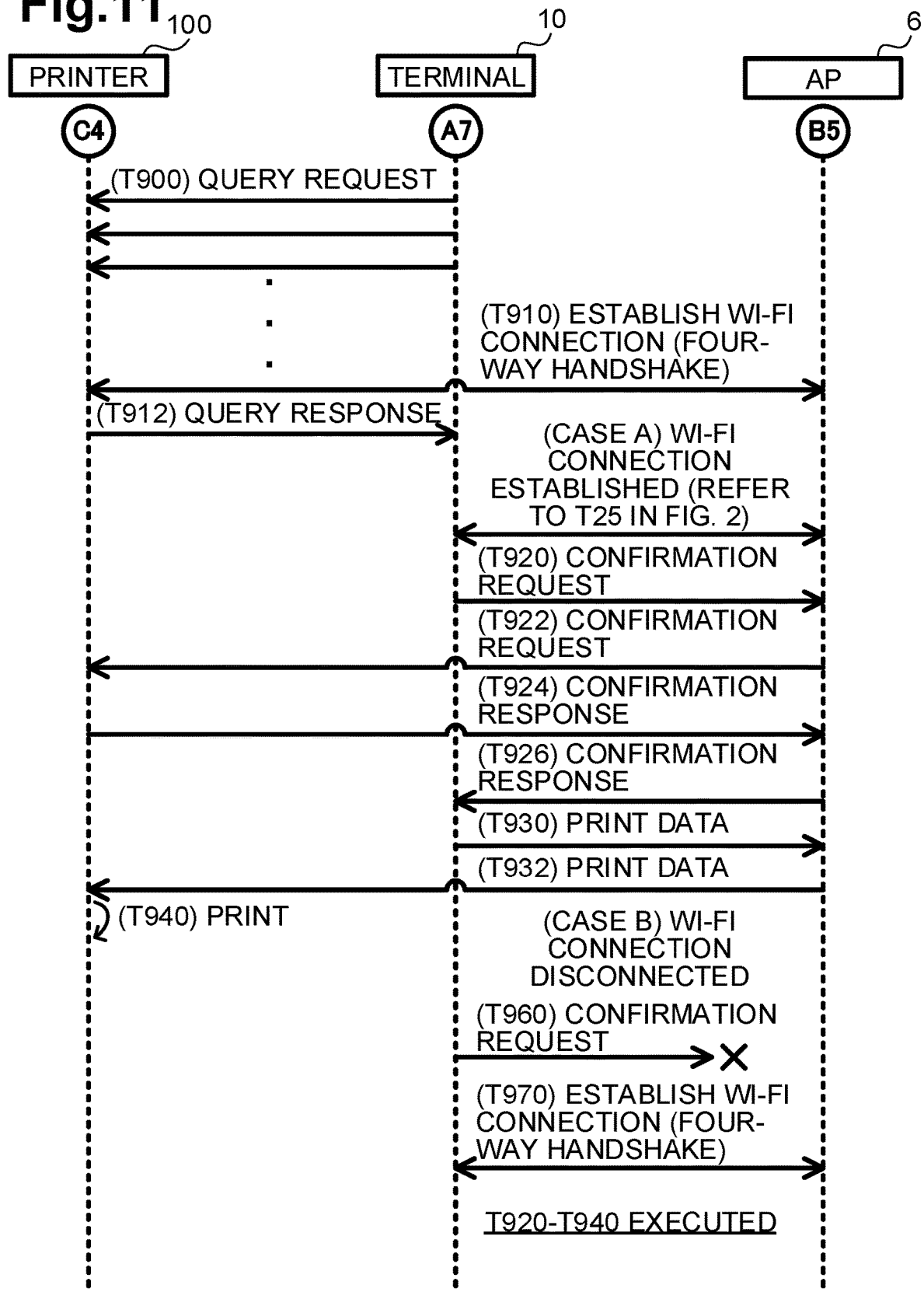

TERMINAL DEVICE, ACCESS POINT, COMMUNICATION DEVICE, AND COMPUTER PROGRAMS THEREFOR

CROSS-REFERENCE TO RELATED APPLICATION

This application is a continuation of prior U.S. application Ser. No. 17/531,872, filed Nov. 22, 2021, which is a continuation of prior U.S. application Ser. No. 16/798,663, filed Feb. 24, 2020, issued Dec. 14, 2021 as U.S. Pat. No. 11,200,012 B2, which is a continuation of prior U.S. application Ser. No. 16/371,496, filed Apr. 1, 2019, issued Apr. 7, 2020 as U.S. Pat. No. 10,613,805 B2, which claims priority from Japanese Patent Application No. 2018-068822 filed on Mar. 30, 2018, the content of which is incorporated herein by reference in its entirety.

FIELD OF DISCLOSURE

Aspects described herein relate to a technique for a terminal device and a communication device that are capable of establishing a wireless connection with an external device.

BACKGROUND

A device provisioning protocol ("DPP") is described in, for example, non-patent literature, "DRAFT Device Provisioning Protocol Technical Specification Version 0.2.11" provided by Wi-Fi Alliance. The DPP facilitates establishment of a Wi-Fi connection. The DPP non-patent literature describes using a terminal device to establish a Wi-Fi connection between a client device and an access point and formation of an infrastructure network.

SUMMARY

The DPP non-patent literature does not describe a specific method for using the terminal device to establish a Wi-Fi connection between the terminal device and the client device via the access point. For example, the DPP non-patent literature does not describe a method for using a terminal device (e.g., phone) to connect the terminal device to a client device (e.g., a printer) via an access point, so that the terminal device may transmit user data (e.g., print data) to the client device.

One or more aspects of the disclosure provide a technique of appropriately establishing a wireless connection between a terminal device and an external device and between a communication device and the external device.

One of the aspects of this disclosure includes a terminal device (e.g., smartphone, tablet, etc.) that may comprise a memory configured to store a private key used to encrypt information obtained using at least a piece of first connection information that is stored in an external device (e.g., an access point) to establish a first wireless connection between the terminal device and the external device via a wireless interface of the terminal device. One of the aspects of this disclosure also includes one or more non-transitory computer-readable media storing instructions that, when executed by one or more processors, cause a terminal device to perform various processes. For example, the instructions may cause the terminal device to obtain a first public key of a communication device (e.g., a printer) and to send, to the communication device via the wireless interface, a first authentication request generated using the first public key. The instructions may also cause the terminal device to receive, from the communication device via the wireless interface, a first authentication response responsive to the first authentication request. After the first authentication response is received from the communication device, the instructions may cause the terminal device to generate, using the private key, second connection information for establishing a second wireless connection between the communication device and the external device. The private key may also be used to encrypt information obtained using at least a piece of the second connection information. Further, the instructions may cause the terminal device to send the second connection information to the communication device via the wireless interface.

According to one or more aspects of the disclosure, the private key used for encrypting the information obtained using at least a piece of information included in first connection information for the external device may be the same as the private key used for encrypting the information obtained using at least a piece of information included in second connection information for the communication device. The external device may use the first connection information, in order to establish the first wireless connection between the terminal device and the external device. The communication device may use the second connection information, in order to establish the second wireless connection between the communication device and the external device. The wireless connections may be established appropriately between the terminal device and the external device and between the communication device and the external device.

One of the aspects of this disclosure includes a communication device (e.g., printer, multi-function peripheral (MFP), etc.) that may comprise a wireless interface (e.g., WiFi interface), one or more processors, and a memory. The memory may store instructions that, when executed by the one or more processors, cause the communication device to: receive, from a terminal device via the wireless interface, an authentication request generated using a first public key of the communication device; send, to the terminal device via the wireless interface, an authentication response responsive to the authentication request; and after sending the authentication response to the terminal device, receive, from the terminal device via the wireless interface, connection information and specific information. The connection information may comprise information for establishing a second wireless connection between the communication device and an external device via the wireless interface. The specific information may comprise at least one of: channel information indicating a communication channel used in a first wireless connection between the terminal device and the external device, or device identification information identifying the external device. The instructions may also cause the communication device to establish, using the connection information and the specific information, the second wireless connection between the communication device and the external device.

According to one or more aspects of the disclosure, in a case where the communication device may receive the authentication request from the terminal device, the communication device may send the authentication response to the terminal device and receive the connection information and the specific information from the terminal device. The specific information may include at least one of channel information indicating the communication channel used in the first wireless connection established between the terminal device and the external device and the device identification information identifying the external device. The communication device may establish appropriately the second wireless connection between the communication device and the external device by using the connection information and the specific information. The wireless connections may be established appropriately between the terminal device and the external device and between the communication device and the external device.

The terminal device itself and computer-readable storage media storing computer programs for the terminal device have novelty and utility. The communication device itself and computer-readable storage media storing computer programs for the communication device have novelty and utility. Methods to be executed by the terminal device and the communication device have novelty and utility. A communication system including the terminal device and the communication device also have novelty and utility.

BRIEF DESCRIPTION OF THE DRAWINGS

FIG. 7 is a sequence diagram illustrating Bootstrapping with the printer in an illustrative embodiment according to one or more aspects of the disclosure.

FIG. 8 is a sequence diagram illustrating Authentication with the printer in an illustrative embodiment according to one or more aspects of the disclosure.

FIG. 9 is a sequence diagram illustrating Configuration with the printer in an illustrative embodiment according to one or more aspects of the disclosure.

FIG. 10 is a sequence diagram illustrating Network Access between the printer and the AP in an illustrative embodiment according to one or more aspects of the disclosure.

FIG. 11 is a sequence diagram illustrating processes performed between the terminal, the printer, and the AP, in an illustrative embodiment according to one or more aspects of the disclosure.

Figure 1:
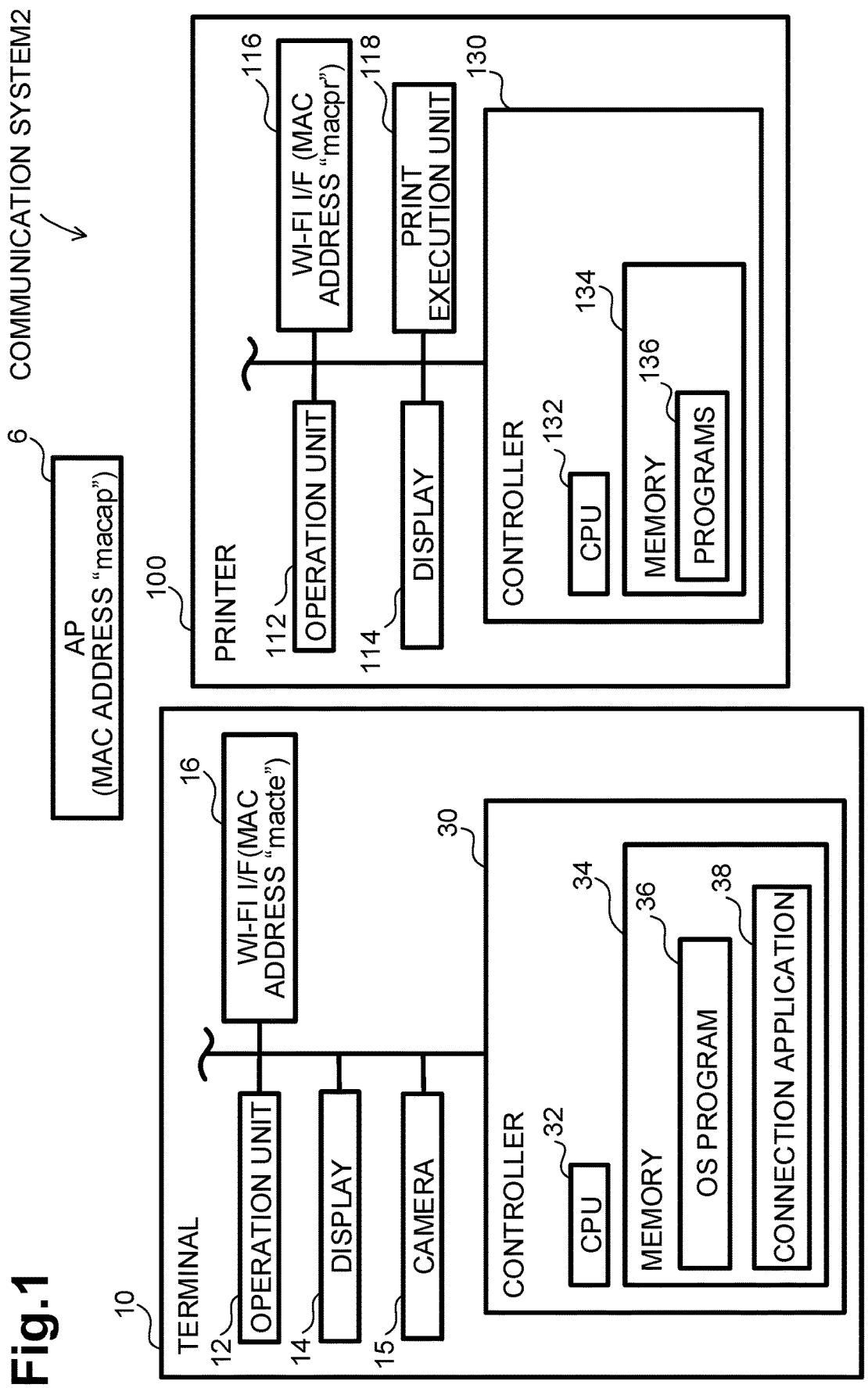
FIG. 1 illustrates a configuration of a communication system including a terminal, a printer and an access point (AP), in an illustrative embodiment according to one or more aspects of the disclosure.

DETAILED DESCRIPTION (Configuration of Communication System 2; FIG. 1)

As depicted in FIG. 1, a communication system 2 includes an access point ("AP") 6, a terminal 10, and a printer 100. In an illustrative embodiment, a user uses the terminal 10 to establish a wireless connection based on Wi-Fi technology (hereinafter referred to as a "Wi-Fi connection") between the terminal 10 and the AP 6, and then between the printer 100 and the AP 6.

(Configuration of Terminal 10)

The terminal 10 may be a portable terminal device, such as a mobile phone (e.g., a smart phone), a PDA, and a tablet PC. In another embodiment, the terminal 10 may be a desktop computer or a laptop computer.

The terminal 10 includes an operation unit 12, a display 14, a camera 15, and a Wi-Fi interface ("I/F") 16, and a controller 30 that are interconnected via bus lines (no reference number designated).

The operation unit 12 includes a plurality of keys. A user can input a variety of instructions to the terminal 10 by operating the operation unit 12. The display 14 is configured to display a variety of information. The display 14 may include a touch screen display that functions as an operation unit and receives user's instructions. The camera 15 is configured to take photographs of objects. In an illustrative embodiment, the camera 15 may be used to scan a QR code (registered trademark) provided for each of the AP 6 and the printer 100.

The Wi-Fi I/F 16 has a MAC address (e.g., "macte") assigned thereto. The Wi-Fi I/F 16 is a wireless communication interface that allows for wireless communication in accordance with a Wi-Fi technology as provided in, for example, IEEE (The Institute of Electrical and Electronics Engineers, Inc.) 802.11 standards and other standards (e.g., 802.11a, 11b, 11g, 11n, and 11ac). The Wi-Fi I/F 16 supports a device provisioning protocol ("DPP") whose draft specification will be finalized by Wi-Fi Alliance. The draft specification, "DRAFT Device Provisioning Protocol Technical Specification Version 0.2.11" provided by Wi-Fi Alliance, describes DPP that provides a method for readily establishing a Wi-Fi connection, using the terminal 10, between a pair of devices (e.g., between the terminal 10 and the AP 6 or between the printer 100 and the AP 6).

The controller 30 includes a CPU 32 and memory 34. The CPU 32 is configured to execute various processing based on programs 36 and 38 stored in the memory 34. The memory 34 may be volatile or nonvolatile memory. The memory 34 stores therein an OS program 36, and a connection application 38 (hereinafter simply referred to as the "app 38").

The OS program 36 is a program for controlling principle operations of the terminal 10. The app 38 is a program for establishing a Wi-Fi connection between a pair of devices in accordance with the DPP. The app 38 may be installed in the terminal 10 from a server on the Internet. The server may be provided by, for example, a vendor of the printer 100.

(Configuration of Printer 100)

The printer 100 is a peripheral device of, for example, the terminal device 10. The printer 100 is configured to execute printing. The printer 100 includes an operation unit 112, a display 114, a Wi-Fi I/F 116, a print execution unit 118, and a controller 130 that are interconnected via bus lines (no reference number designated).

The operation unit 112 includes a plurality of keys. A user can input a variety of instructions to the printer 100 by operating the operation unit 112. The display 114 is configured to display a variety of information. The display 114 may include a touch screen display that functions as an operation unit and receives user's instructions. The Wi-Fi I/F 116 has similar configuration to the Wi-Fi I/F 16 of the terminal 10, and supports the DPP. The Wi-Fi I/F 116 has a MAC address (e.g., "macpr") assigned thereto. The print execution unit 118 includes, for example, an inkjet or laser printing mechanism.

The controller 130 includes a CPU 132 and memory 134. The CPU 132 is configured to execute various processing based on the programs 136 stored in the memory 134. The memory 134 may be volatile or nonvolatile memory.

Figure 2:
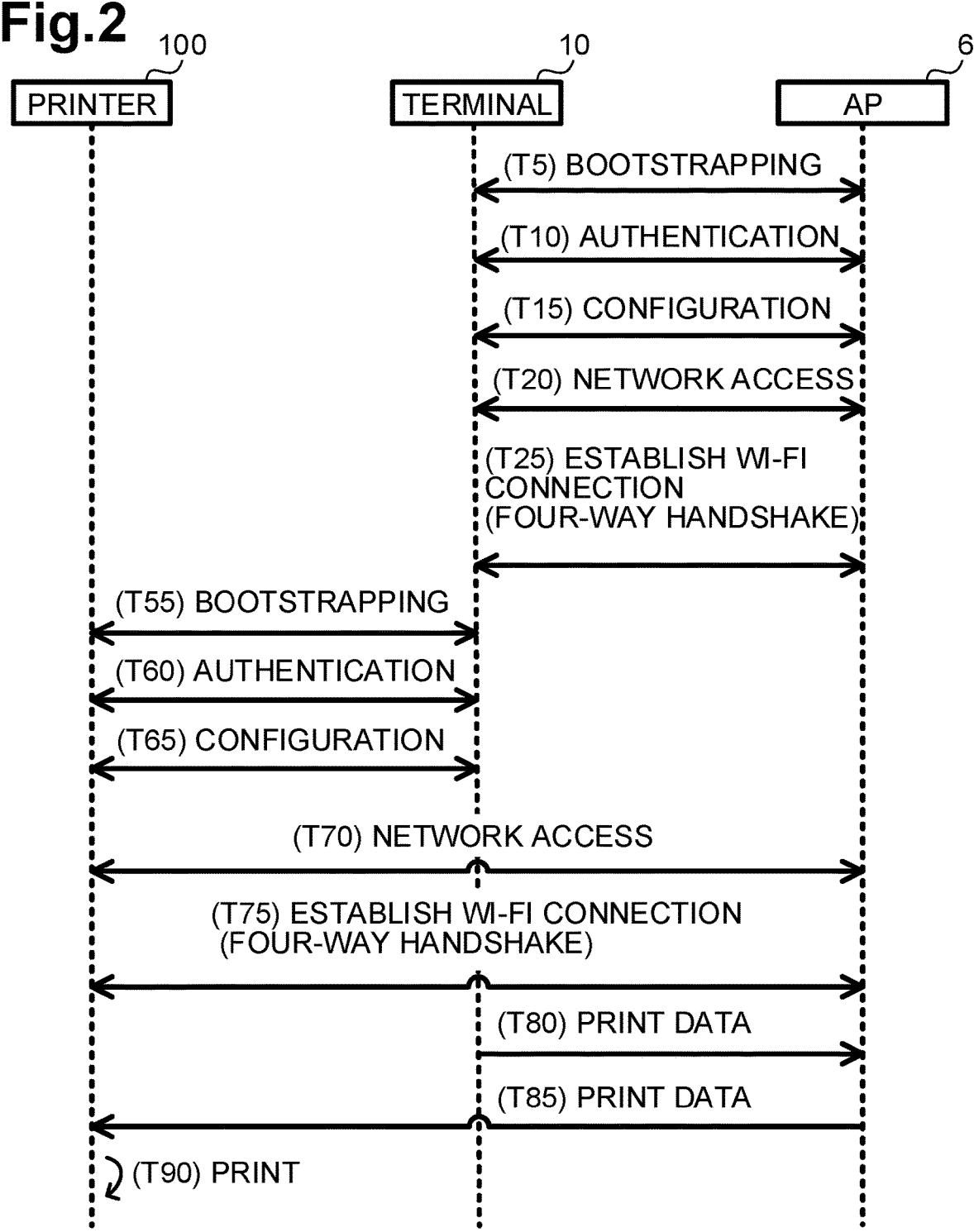
FIG. 2 is a diagram illustrating an outline of an illustrative embodiment according to one or more aspects of the disclosure.

(Outline of Illustrative Embodiment; FIG. 2)

Referring to FIG. 2, an outline of the illustrative embodiment will now be described. The AP 6 also supports the DPP as the terminal 10 and the printer 100 do. The AP 6 has a MAC address (e.g., "macap") assigned thereto. In the illustrative embodiment, the devices 6, 10, and 100 perform communication therebetween based on the DPP, thereby establishing a Wi-Fi connection between the terminal 10 and the AP 6 and between the printer 100 and the AP 6. For ease of understanding, the following disclosure describes the processes/steps as being performed by the devices (e.g., the terminal 10 and the printer 100); however, it should be understood that the CPUs 32 and 132 may execute the processes/steps.

At T5, the terminal 10 executes DPP Bootstrapping with the AP 6. The Bootstrapping at T5 is a process for providing information, which is used for a subsequent DPP Authentication at T10, from the AP 6 to the terminal 10. The Bootstrapping may include scanning of a code (e.g., Quick Response (QR) code) by the terminal 10. The QR code may be attached to the AP 6.

At T10, the terminal 10 executes the DPP Authentication with the AP 6 using the information obtained at T5. The Authentication at T10 is a process for authenticating the terminal 10 and the AP 6 to each other.

At T15, the terminal 10 executes DPP Configuration with the AP 6. The Configuration at T15 is a process for sending, from the terminal 10 to the AP 6, information for allowing the AP 6 to establish a Wi-Fi connection with the terminal 10. In one example, the terminal 10 generates a configuration object ("CO") for the AP 6. The configuration object for the AP 6 may be herein referred to as an "AP configuration object". The terminal 10 sends the AP configuration object to the AP 6. The AP 6 receives and stores the AP configuration object therein.

At T20, the terminal 10 executes DPP Network Access with the AP 6. In the Network Access at T20, the terminal 10 generates a CO for the terminal 10 and stores the CO in the memory 34. The CO for the terminal 10 may be herein referred to as a "terminal configuration object". Using the terminal configuration object and the AP configuration object, the terminal 10 and the AP 6 share a connector key for establishing a Wi-Fi connection therebetween.

At T25, the terminal 10 and the AP 6 execute a four-way handshake. During the four-way handshake, each of the terminal 10 and the AP 6 sends information encrypted using the connector key shared in the Network Access at T20. If decryption of the encrypted information is successful, a Wi-Fi connection is established between the terminal 10 and the AP 6. The terminal 10 joins a wireless network formed by the AP 6 as a child station. In other words, the terminal 10 and the AP 6 are on the same network in which the terminal 10 is a child station and the AP 6 is a parent station. In another embodiment, simultaneous authentication of equals ("SAE" or what is called "Dragonfly") may be used for the four-way handshake.

Subsequently, at T55, the terminal 10 executes DPP Bootstrapping with the printer 100. The Bootstrapping at T55 is a process for providing information, which is used for a subsequent DPP Authentication at T60, from the printer 100 to the terminal 10. The Bootstrapping may include scanning of a Quick Response (QR) code by the terminal 10. The QR code may be displayed on the printer 100.

At T60, the terminal 10 executes the DPP Authentication with the printer 100 using the information obtained at T55. The Authentication at T60 is a process for authenticating the terminal 10 and the printer 100 to each other.

At T65, the terminal 10 executes DPP Configuration with the printer 100. The Configuration at T65 is a process for sending, from the terminal 10 to the printer 100, information for allowing the printer 100 to establish a Wi-Fi connection with the AP 6. In one example, the terminal 10 generates a CO for the printer 100 and sends the CO to the printer 100. The CO for the printer 100 may be herein referred to as a "printer configuration object". The printer 100 receives and stores the printer configuration object therein.

At T70, the printer 100 and the AP 6 execute DPP Network Access using the printer configuration object and the AP configuration object. The Network Access at T70 is a process for sharing, between the printer 100 and the AP 6, a connector key for establishing a Wi-Fi connection therebetween.

At T75, the printer 100 and the AP 6 execute a handshake (e.g., a four-way handshake). During the four-way handshake, each of the printer 100 and the AP 6 sends information encrypted using the connector key shared in the Network Access at T70. If decryption of the encrypted information is successful, a Wi-Fi connection is established between the printer 100 and the AP 6. The printer 100 joins, as a child station, the wireless network formed by the AP 6. In other words, the printer 100 and the AP 6 are on the same network in which the printer 100 is a child station and the AP 6 is a parent station.

After successful completion of T5 through T75, the terminal 10 and the printer 100 are on the wireless network, which is formed by the AP 6, as child stations. This may allow the terminal 10 and the printer 100 to communicate with each other, via the AP 6, using the wireless network. For example, the terminal 10 and the printer 100 may perform the following communications. At T80, the terminal 10 sends print data that represents an image to be printed, to the AP 6. At T85, the AP 6 sends the print data to the printer 100. At T90, the printer 100 executes printing based on the print data.

With the DPP, a user can readily establish a Wi-Fi connection between the terminal 10 and the AP 6 and between the printer 100 and the AP 6, e.g., readily add a new device (e.g., the printer 100 and the terminal 10) to a wireless network in which the AP 6 acts as a parent station, without entering, into the terminal 10 and the printer 100, information of the wireless network (e.g., a service set identifier ("SSID") and a password).

Figure 3:
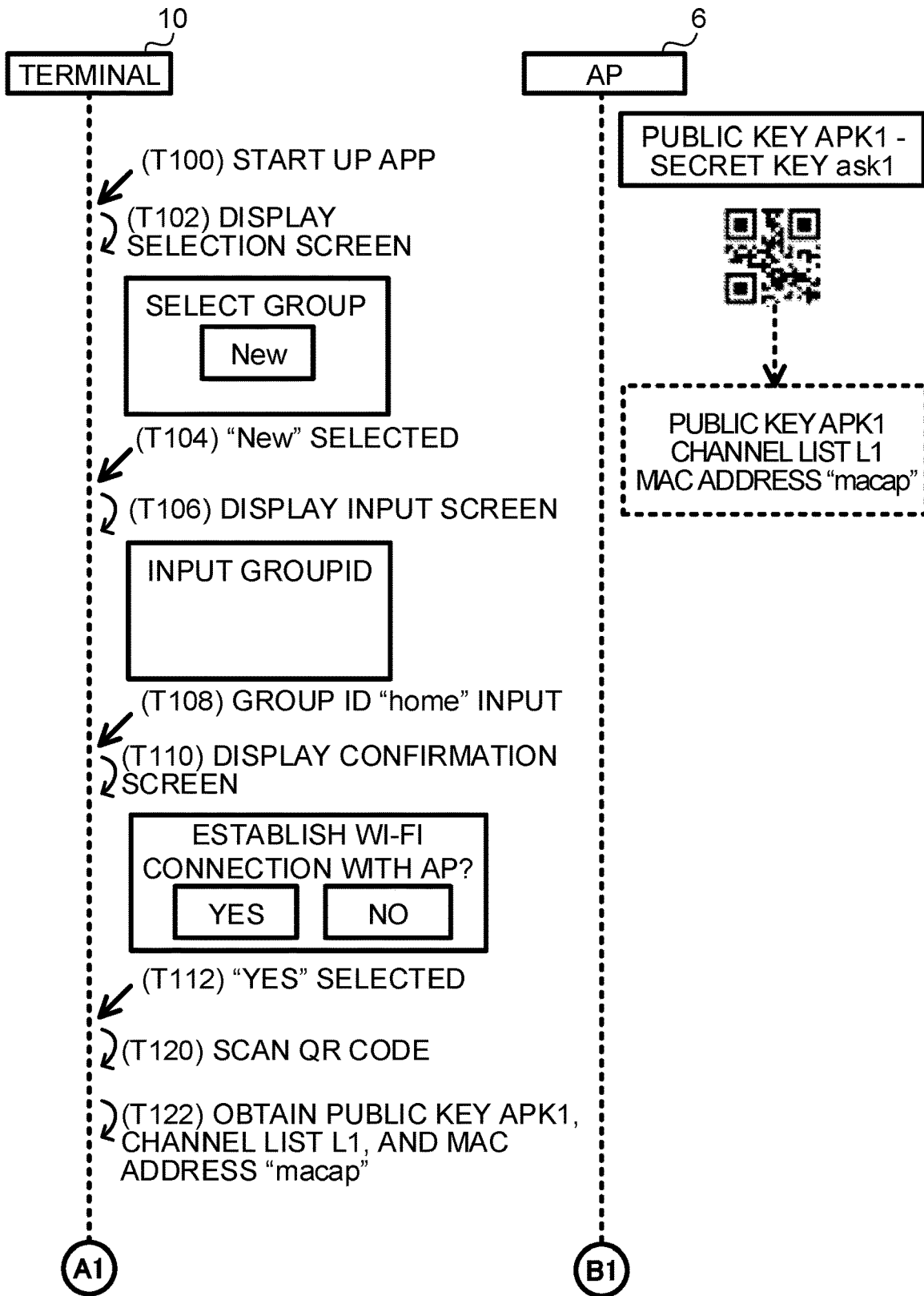
FIG. 3 is a sequence diagram illustrating Bootstrapping with the AP in an illustrative embodiment according to one or more aspects of the disclosure.

(Bootstrapping with AP 6; FIG. 3)

Referring to FIGS. 3 through 10, steps T5-T20 and T55-T70 in FIG. 2 will be described in detail below. The Bootstrapping, at T5 in FIG. 2, between the terminal 10 and the AP 6 will now be described referring to FIG. 3. In a state in FIG. 3 prior to an execution of T100, the AP 6 has stored a public key APK1 and a private key ask1 thereof (see right-hand side of FIG. 3). The AP 6 has a QR code attached to a casing thereof. The QR code is obtained by encoding the public key APK1 of the AP 6, a channel list L1 of the AP 6, and the MAC address (e.g., "macap") of the AP 6. The channel list L1 lists a plurality of communication channels to be used for the Authentication (refer to T10 in FIG. 2). In other words, the channel list L1 lists communication channels usable by the AP 6.

Based on receiving a user's operation for starting up the app 38, the terminal 10 causes the app 38 to start up at T100. The following processing to be performed by the terminal 10 may be implemented by the app 38. Subsequently, at T102, the terminal 10 causes the display 14 to display a selection screen. The selection screen may include a "New" button that represents an option for establishing a new Wi-Fi connection by the terminal 10 (e.g., creation of a wireless network by the terminal 10).

Based on a user's selection of the "New" button in the selection screen at T104, the terminal 10 causes the display 14 to display, at T106, an input screen for inputting a group ID. The group ID is information for identifying the wireless network to be formed as the terminal 10 establishes the new Wi-Fi connection.

Based on a user's input of the group ID, e.g., "home" in the selection screen at T108, the terminal 10 may cause the display 14 to display, at T110, a confirmation screen for encouraging the user to confirm whether to allow the terminal 10 to establish a Wi-Fi connection with the AP 6. The confirmation screen includes a "YES" button for allowing the terminal 10 to establish a Wi-Fi connection with the AP 6 and a "NO" button for not allowing the terminal 10 to establish a Wi-Fi connection with the AP 6.

Based on a user's selection of the "YES" button in the confirmation screen at T112, the terminal 10 causes the camera 15 to activate. At T120, the terminal 10 causes the camera 15 to scan the QR code, which may be attached to the casing of the AP 6. At T122, the terminal 10 decodes the scanned QR code and obtains the public key APK1, the channel list L1, and the MAC address (e.g., "macap"). Upon completion of T122, the Bootstrapping with the AP 6 in FIG. 3 ends.

Figure 4:
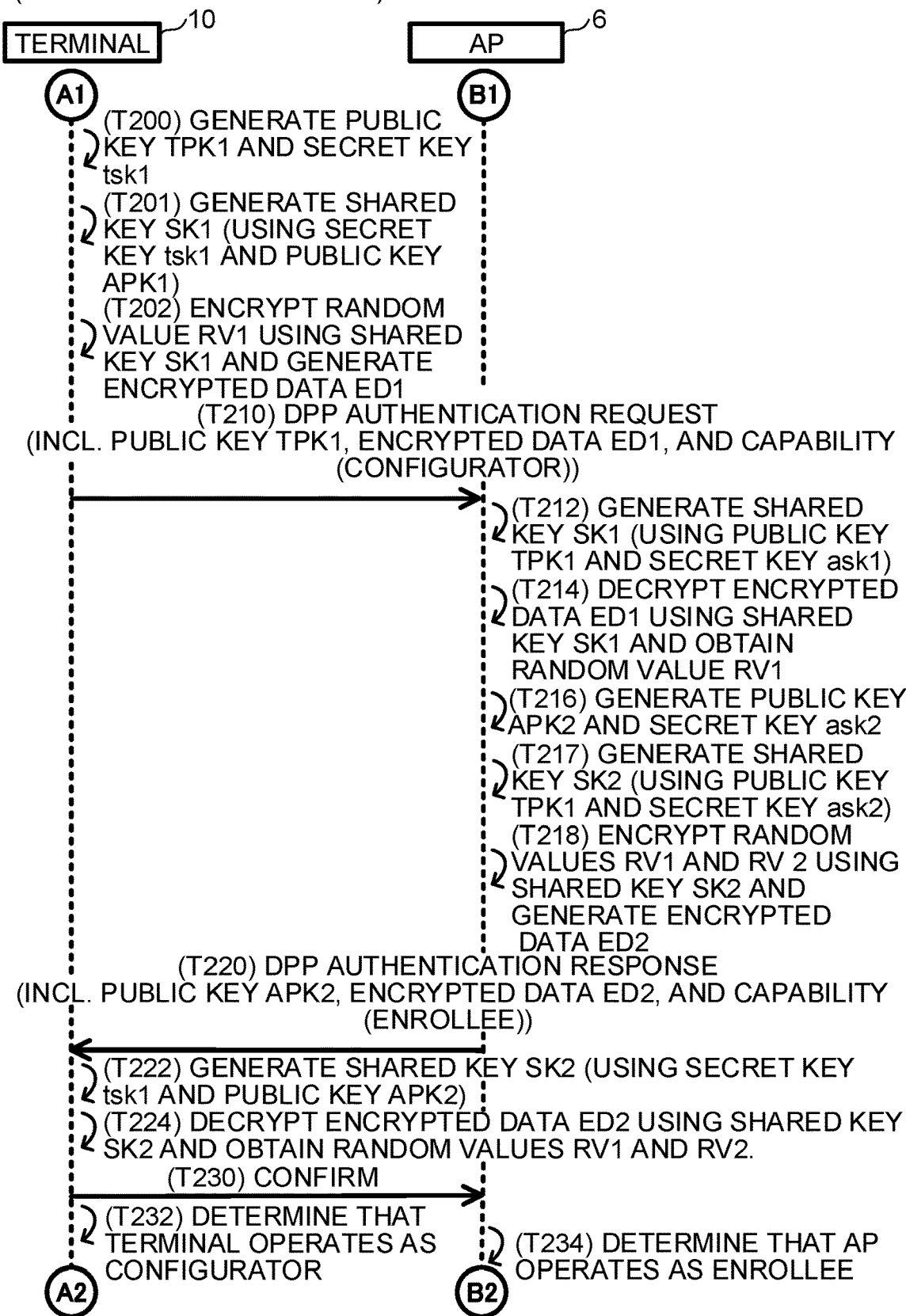
FIG. 4 is a sequence diagram illustrating Authentication with the AP in an illustrative embodiment according to one or more aspects of the disclosure.

(Authentication with AP 6; FIG. 4)

Referring to FIG. 4, the Authentication, at T10 in FIG. 2, between the terminal 10 and the AP 6 will now be described.

At 200, the terminal 10 generates a public key TPK1 and a private/secret key tsk1 thereof. Subsequently, at T201, the terminal 10 generates a shared key SK1 using the generated private key tsk1 of the terminal 10, and the public key APK1 of the AP 6 that is obtained at T122 in FIG. 3. The shared key SK1 may be generated based on Elliptic Curve Diffie-Hellman key exchange ("ECDH"). At T202, the terminal 10 encrypts a random value RV1 using the shared key SK1 and generates encrypted data ED1.

At T210, the terminal 10 sends, via the Wi-Fi I/F 16, a DPP Authentication Request (hereinafter referred to as an "AReq") to the AP 6, e.g., to the MAC address "macap", obtained at T122 in FIG. 3, as a recipient. The AReq is a signal for requesting the AP 6 to execute authentication. The AReq includes the public key TPK1 of the terminal 10, which is generated at T200, and the encrypted data ED1, which is generated at T202, and capability information (described below) of the terminal 10. The terminal 10 may send the AReq to the AP one or more times using (e.g., sequentially) one or more communication channels listed or represented in the channel list L1, which is obtained at T122 in FIG. 3.

The capability information is information that is pre-designated for a DPP-supporting device. The capability information may include one of three values: a value representing that the device operates as a DPP Configurator; a value representing that the device operates as a DPP Enrollee; and a value representing that the device operates as both the Configurator and the Enrollee. The Configurator refers to a device that sends, in the Configuration process (e.g., T15 in FIG. 2), a CO for use in the Network Access process (e.g., T20 in FIG. 2), to an Enrollee. The Enrollee refers to a device that receives, in the Configuration, a CO for use in the Network Access, from the Configurator. In an illustrative embodiment, the terminal 10 generates the AP configuration object and sends the configuration object to the AP 6, and also generates the printer configuration object, and sends the configuration object to the printer 100, as described above. The capability information of the terminal 10 includes a value representing that the terminal 10 operates as a Configurator.

At T210, the AP 6 receives the AReq from the terminal 10. As described above, the AReq is sent to the MAC address "macap" of the AP 6 as a recipient. The AP 6 may thus receive the AReq from the terminal 10 appropriately. The AP 6 monitors reception of the AReq that is sent using one of the communication channels (which are usable by the AP 6) in the channel list L1. As described above, the AReq at T210 may be sent one or more times using (e.g., sequentially) one or more communication channels listed or represented in the channel list L1, and the AP 6 may receive the AReq from the terminal 10 appropriately.

Subsequently, the AP 6 executes the following steps for authenticating the sender (e.g., the terminal 10) of the AReq. In one example, at T212, the AP 6 generates a shared key SK1, based on the ECDH, using the public key TPK1 of the terminal 10 in the AReq and the private key ask1 of the AP 6. The shared key SK1 generated by the AP 6 at T212 is the same as the shared key SK1 generated by the terminal 10 at T201. At T214, the AP 6 may successfully decrypt the encrypted data ED1 in the AReq using the shared key SK1, and may obtain the random value RV1. If the decryption of the encrypted data ED1 is successful, the AP 6 determines that the sender of the AReq is a device that scans the QR code of the AP 6, e.g., determines that the authentication is successful. The AP 6 executes T216 and its subsequent steps. If the decryption of the encrypted data ED1 is not successful, the AP 6 determines that the sender of the AReq is not a device that scans the QR code of the AP 6, e.g., determines that the authentication is not successful, and does not execute T216 or its subsequent steps.

At T216, the AP 6 generates a public key APK2 and a private key ask2 thereof. In another embodiment, the AP 6 may pre-store the public key APK2 and the private key ask2. Subsequently, at T217, the AP 6 generates a shared key SK2, based on the ECDH, using the public key TPK1 of the terminal 10 in the AReq at T210 and the generated private key ask2 of the AP 6. At T218, the AP 6 encrypts the random value RV1 and a random value RV2 using the shared key SK2 and generates encrypted data ED2.

At T220, the AP 6 sends a DPP Authentication Response (hereinafter referred to as an "ARes") to the terminal 10. The ARes includes the public key APK2 of the AP 6 generated at T216, the encrypted data ED2 generated at T218, and capability information of the AP6. This capability information includes a value representing that the AP 6 operates as an Enrollee.

Based on receiving the ARes from the AP 6 via the Wi-Fi I/F 16, the terminal 10 executes the following steps for authenticating the sender (e.g., the AP 6) of the ARes. In one example, at T222, the terminal 10 generates a shared key SK2, based on the ECDH, using the private key tsk1 of the terminal 10 generated at T200, and the public key APK2 of the AP 6 in the ARes. The shared key SK2 generated by the terminal 10 at T222 is the same as the shared key SK2 generated by the AP 6 at T217. At T224, the terminal 10 successfully decrypts the encrypted data ED2 in the ARes using the shared key SK2, and obtains the random values RV1 and RV2. If the decryption of the encrypted data ED2 is successful, the terminal 10 determines that the sender of the ARes is a device having the QR code that the terminal 10 has scanned, e.g., determines that the authentication is successful. The terminal 10 executes T230 and its subsequent steps. If the decryption of the encrypted data ED2 is not successful, the terminal 10 determines that the sender of the ARes is not a device having the QR code that the terminal 10 has scanned, e.g., determines that the authentication is not successful, and does not execute T230 or its subsequent steps.

At T230, the terminal 10 sends a Confirm message to the AP 6 via the Wi-Fi I/F 16. The Confirm message includes information representing that the terminal 10 operates as a Configurator and the AP 6 operates as an Enrollee, so that the terminal 10 determines, at T232, that the terminal 10 operates as a Configurator and the AP 6 determines, at T234, that the AP 6 operates as an Enrollee. Upon completion of T234, the Authentication with the AP 6 in FIG. 4 ends. After ending the processes in FIG. 4, the terminal 10 discards the public key TPK1 and the private key tsk1 (e.g., deletes the keys from the memory 34).

Figure 5:
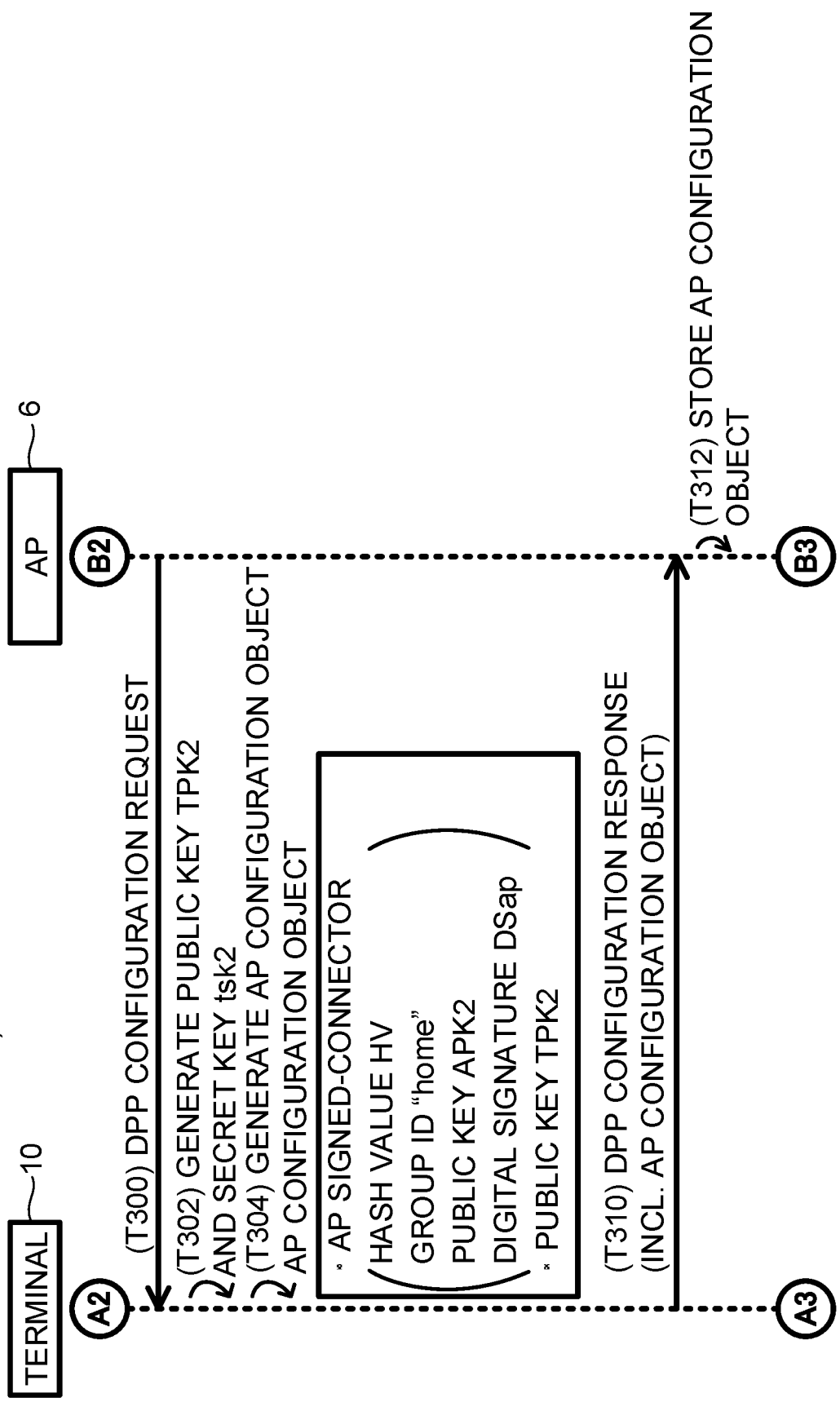
FIG. 5 is a sequence diagram illustrating Configuration with the AP in an illustrative embodiment according to one or more aspects of the disclosure.

(Configuration with AP 6; FIG. 5)

Referring to FIG. 5, the Configuration process, at T15 in FIG. 2, between the terminal 10 and the AP 6 will now be described.

At T300, the AP 6 sends a DPP Configuration Request (hereinafter referred to as a "CReq") to the terminal 10. The CReq is a signal for requesting the terminal 10 to send the AP configuration object.

At T300, the terminal 10 receives the CReq from the AP 6 via the Wi-Fi I/F 16. Based on receiving the CReq from the AP 6, the terminal 10 generates, at T302, a public key TPK2 and a private key tsk2 thereof, and stores the keys in the memory 34. At T304, the terminal 10 generates an AP configuration object using the generated private key tsk2. In one example, the terminal 10 executes the following steps to generate the AP configuration object.

The terminal 10 performs a hash function of the public key TPK2 of the terminal 10 and generates a hash value HV. The terminal 10 also performs a hash function of a combination of the hash value HV, the group ID (e.g., "home") input at T108 in FIG. 3, and the public key APK2 of the AP 6 in the ARes at T220 in FIG. 4, and generates a first value. The terminal 10 encrypts the first value using the private key tsk2 of the terminal 10 based on an Elliptic Curve Digital Signature Algorithm ("ECDSA"), and generates a digital signature DSap. The terminal 10 generates a signed-connector ("SC") for the AP 6. The SC for the AP 6 may be herein referred to as an "AP signed-connector". The AP signed-connector includes a hash value HV, the group ID (e.g., "home"), the public key APK2 of the AP 6, and the digital signature DSap. Subsequently, the terminal 10 generates an AP configuration object including the AP signed-connector, and the public key TPK2 of the terminal 10.

At T310, the terminal 10 sends, via the Wi-Fi I/F 16, a DPP Configuration Response (hereinafter referred to as a "CRes") to the AP 6. The CRes includes the AP configuration object.

At T310, the AP 6 receives the CRes from the terminal 10. Based on receiving the CRes from the terminal 10, the AP 6 stores, in its memory, the AP configuration object of the CRes at T312. Upon completion of T312, the Configuration with the AP 6 in FIG. 5 ends.

Figure 6:
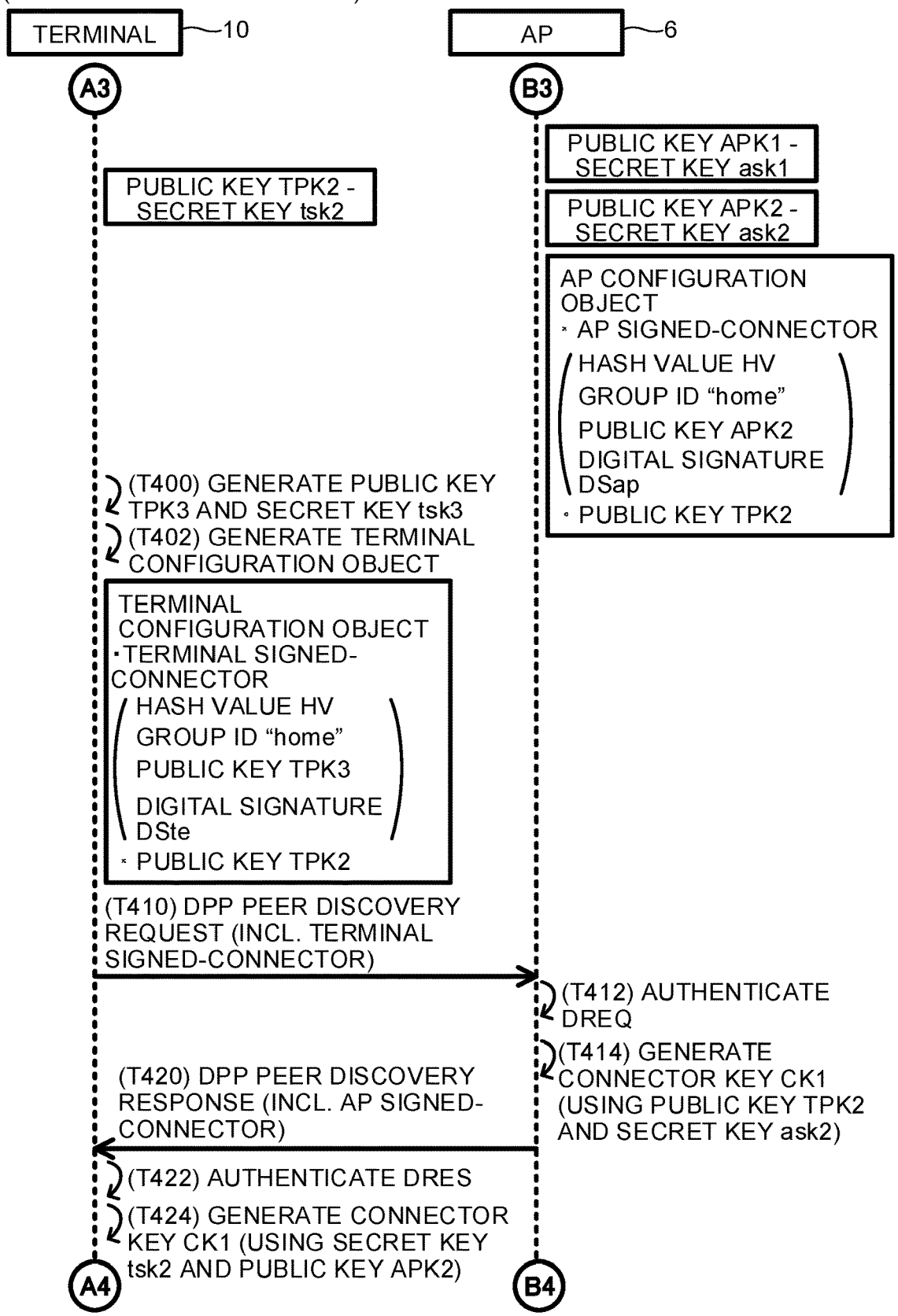
FIG. 6 is a sequence diagram illustrating Network Access with the AP in an illustrative embodiment according to one or more aspects of the disclosure.

(Network Access with AP 6; FIG. 6)

Referring to FIG. 6, the Network Access process, at T20 in FIG. 2, between the terminal 10 and the AP 6 will now be described.

At T400, the terminal 10 generates a public key TPK3 and a private key tsk3 thereof. Subsequently, at T402, the terminal 10 generates a terminal configuration object, using the private key tsk2 of the terminal 10 that is generated at T302 in FIG. 5 and stored in the memory 34. In one example, the terminal 10 executes the following steps to generate a terminal configuration object.

The terminal 10 performs a hash function of the public key TPK2 of the terminal 10 and generates a hash value HV. The terminal 10 also performs a hash function of a combination of the hash value HV, the group ID (e.g., "home") input at T108 in FIG. 3, and the public key TPK3 of the terminal 10 generated at T400, and generates a second value. The terminal 10 encrypts the second value using the private key tsk2 of the terminal 10 based on the ECDSA, and generates a digital signature DSte. The terminal 10 generates a SC for the terminal 10. The SC for the terminal 10 may be herein referred to as a "terminal signed-connector". The terminal signed-connector includes the hash value HV, the group ID (e.g., "home"), the public key TPK3 of the terminal 10, and the digital signature DSte. The hash value HV and the group ID (e.g., "home") in the terminal signed-connector are the same as the hash value HV and the group ID (e.g., "home") in the AP signed-connector, respectively. The public key TPK3 and the digital signature DSte that are included in the terminal signed-connector, may be different from the public key APK2 and the digital signature DSap that are included in the AP signed-connector, respectively. The terminal 10 generates a terminal configuration object and stores the configuration object in the memory 34. The terminal configuration object includes the terminal signed-connector, and the public key TPK2 of the terminal 10 that is generated at T302 in FIG. 5 and stored in the memory 34.

At T410, the terminal 10 sends, via the Wi-Fi I/F 16, a DPP Peer Discovery Request (hereinafter referred to as a "DReq") that includes the terminal signed-connector, to the AP 6. The DReq is a signal for requesting the AP 6 to execute an authentication process and to send the AP signed-connector to the terminal 10.

Based on receiving the DReq from the terminal 10 at T410, the AP 6 executes the authentication process for authenticating the sender (e.g., the terminal 10) of the DReq, and information in the DReq (e.g., the hash value HV, the group ID (e.g., "home"), and the public key TPK3). The authentication process may include a first AP determination process and a second AP determination process, which are described below. In one example, the AP 6 executes, at T412, the first AP determination process. In this process, the AP 6 determines whether the hash value HV and the group ID (e.g., "home") in the terminal signed-connector match the hash value HV and the group ID (e.g., "home") in the AP signed-connector, respectively. In the example case shown in FIG. 6, the AP 6 determines "yes" in the first AP determination process (e.g., determines that the hash value HV and the group ID (e.g., "home") in the terminal signed-connector respectively match the hash value HV and the group ID (e.g., "home") in the AP signed-connector). In other words, the AP 6 determines that authentication of the sender (e.g., the terminal 10) of DReq is successful. Determining "yes" in the first AP determination process means that the terminal signed-connector and the AP signed-connector are both generated by the same device (e.g., the terminal 10). Accordingly, the AP 6 also determines that authentication of the generator (e.g., the terminal 10) of the terminal signed-connector is successful. The AP 6 decrypts the distal signature DSte in the terminal signed-connector, using the public key TPK2, of the terminal 10, included in the AP configuration object. In the example case shown in FIG. 6, the digital signature DSte is successfully decrypted. Subsequently, the AP 6 executes the second AP determination process. In this process, the AP 6 determines whether the second value obtained by decrypting the digital signature DSte matches the value obtained by performing a hash function of information in the terminal signed-connector (e.g., the hash value HV, the group ID "home", and the public key TPK3). In the example case shown in FIG. 6, the AP 6 determines "yes" in the second AP determination process (e.g., determines that the second value obtained by decrypting the digital signature DSte matches the value obtained by performing a hash function of information in the terminal signed-connector). In other words, the AP 6 determines that authentication of the information in the DReq is successful, and executes T414 and its subsequent steps. Determining "yes" in the second AP determination process means that information in the terminal signed-connector has not been altered or modified by someone since the terminal configuration object was stored in the terminal 10. As will be described below in conjunction with T422, T812 and T822, authentication of a DReq and a DRes using a digital signature is executed to verify whether information in the DReq and the DRes has been altered or modified by someone. The AP 6 determines that authentication of the DReq is unsuccessful and does not execute T414 or subsequent steps, in a case where (i) the AP 6 determines "no" in the first AP determination process; (ii) the decryption of the digital signature DSte is unsuccessful; or (iii) the AP 6 determines "no" in the second AP determination process.

Subsequently, at T414, the AP 6 generates a connector key (e.g., shared key) CK1, based on the ECDH, using the public key TPK2 of the terminal 10 in the AP configuration object and the private key ask2 of the AP 6.

At T420, the AP 6 sends, to the terminal 10, a DPP Peer Discovery Response ("DRes") including the AP signed-connector.

Based on receiving the DRes from the AP 6 via Wi-Fi I/F 16 at T420, the terminal 10 executes an authentication process for authenticating the sender (e.g., the AP 6) of the DRes, and information in the DRes (e.g., the hash value HV, the group ID (e.g., "home"), and the public key APK2). The authentication process may include a first terminal determination process and a second terminal determination process, which are described below. In one example, the terminal 10 executes, at T422, the first terminal determination process. In this process, the terminal 10 determines whether the hash value HV and the group ID (e.g., "home") in the AP signed-connector respectively match the hash value HV and the group ID (e.g., "home") in the terminal signed-connector. In the example case of FIG. 6, the terminal 10 determines "yes" in the first terminal determination process (e.g., determines that the hash value HV and the group ID (e.g., "home") in the AP signed-connector respectively match the hash value HV and the group ID (e.g., "home") in the terminal signed-connector). In other words, the terminal 10 determines that authentication of the sender (e.g., the AP 6) of DRes is successful. Determining "yes" in the first terminal determination process means that the terminal signed-connector and the AP signed-connector are both generated by the same device (e.g., the terminal 10). Accordingly, the terminal 10 also determines that authentication of the generator (e.g., the terminal 10) of the AP signed-connector is successful. The terminal 10 decrypts the distal signature DSap in the AP signed-connector, using the public key TPK2, of the terminal 10, included in the terminal configuration object. In the example case shown in FIG. 6, the digital signature DSap is successfully decrypted. Subsequently, the terminal 10 executes the second terminal determination process. In this process, the terminal 10 determines whether the first value obtained by decrypting the digital signature DSap matches the value obtained by performing a hash function of information in the AP signed-connector (e.g., the hash value HV, the group ID (e.g., "home"), and the public key APK2). In the example case of FIG. 6, the terminal 10 determines "yes" in the second terminal determination process (e.g., determines that the first value matches the value obtained by performing a hash function of the information in the AP signed-connector). In other words, the terminal 10 determines that authentication of the information in the DRes is successful, and executes T424 and its subsequent steps. The terminal 10 determines that authentication of the DRes is unsuccessful and does not execute T424 or subsequent steps, in a case where (i) the terminal 10 determines "no" in the first terminal determination process; (ii) the decryption of the digital signature DSap is unsuccessful; or (iii) the terminal 10 determines "no" in the second terminal determination process.

At T424, the terminal 10 generates a connector key CK1 based on the ECDH, using the private key tsk2 of the terminal 10, and the public key APK2 of the AP 6 in the AP signed-connector. The connector key CK1 generated by the terminal 10 at T424 is the same as the connector key CK1 generated by the AP 6 at T414. The connector key CK1 is thus shared between the terminal 10 and the AP 6 to establish a Wi-Fi connection therebetween. Upon completion of T424, the Network Access process with the AP 6 in FIG. 6 ends.

As described above, the connector key CK1 is shared between the terminal 10 and the AP 6. Subsequently, the terminal 10 and the AP 6 execute, at T25 in FIG. 2, a four-way handshake using the connector key CK1, and a Wi-Fi connection is established between the terminal 10 and the AP 6.

(Bootstrapping with Printer 100; FIG. 7)

Referring to FIG. 7, the Bootstrapping, at T55 in FIG. 2, between the terminal 10 and the printer 100 will now be described. In a state in FIG. 7 prior to an execution of T500, the terminal 10 has stored, in the memory 34, the public and private keys TPK2 and tsk2 thereof (refer to T302 in FIG. 5); the public and private keys TPK3 and tsk3 thereof (refer to T400 in FIG. 6); and the terminal configuration object (refer to T402). A public key PPK1 and a private key psk1 may be pre-stored (e.g., by a printer manufacturer) in the memory 134 of the printer 100.

Step T500 is similar to T100 in FIG. 3. The terminal 10 obtains the group ID (e.g., "home") included in the terminal signed-connector, which is in the terminal configuration object stored in the memory 34. At T502, the terminal 10 causes the display 14 to display a selection screen including buttons, e.g., "New" and "home", which is the same character string as the obtained group ID "home".

To establish a Wi-Fi connection between the printer 100 and the AP 6, the user may select, at T504, the "home" button in the selection screen. Since the user input the character string "home" (refer to T108 in FIG. 3), the user may readily understand that the "home" button should be selected to establish a Wi-Fi connection between the printer 100 and the AP 6. To establish a Wi-Fi connection between the terminal 10 and a particular AP that is different from the AP 6, the user can select the "New" button in the selection screen. In this case, the terminal 10 similarly executes processes, as described above in conjunction with FIGS. 3-6, with the particular AP, to establish a Wi-Fi connection between the terminal 10 and the particular AP. Thus, a Wi-Fi connection may be appropriately established between a pair of devices as the user desires. Based on a user's selection of the "home" button in the selection screen at T504, the terminal 10 causes the camera 15 to activate, and causes the display 14 to display, at T506, an instruction screen including a message encouraging the user to scan a QR code of the printer 100 (e.g., a message instructing a user how to operate the printer 100 to obtain the printer's QR code).

At T510, a user may perform an operation on the printer 100 (e.g., selecting a button). In some embodiments, the user operation may cause the display 114 of the printer 100 to display the QR code at T512. The QR code is a coded image that is obtained by encoding the public key PPK1 and the channel list L2, which are stored in the memory 134, and the MAC address (e.g., "macpr") of the Wi-Fi I/F 116. The channel list L2 lists a plurality of communication channels to be used for the Authentication process (refer to T60 in FIG. 2). In other words, the channel list L2 lists communication channels usable by the printer 100. The QR code may be generated by the printer 100 at T512 or may be stored in the memory 134 before the printer 100 is shipped.

At T520, the terminal 10 causes the camera 115 to scan the QR code displayed in the printer 100. At T522, the terminal 10 decodes the scanned QR code and obtains the public key PPK1, the channel list L2, and the MAC address "macpr". Upon completion of T522, the Bootstrapping with the printer 100 in FIG. 7 ends.

(Authentication with Printer 100; FIG. 8)

Referring to FIG. 8, the Authentication process, at T60 in FIG. 2, between the terminal 10 and the printer 100 will now be described.

At T600, the terminal 10 generates a public key TPK4 and a private key tsk4 thereof. At T601, the terminal 10 generates a shared key SK3, based on the ECDH, using the generated private key tsk4, and the public key PPK1, of the printer 100, obtained at T522 in FIG. 7. At T602, the terminal 10 encrypts a random value RV3 using the shared key SK3 and generates encrypted data ED3.

At T610, the terminal 10 sends, via the Wi-Fi I/F 16, an AReq to the printer 100, e.g., the MAC address "macpr" that is obtained at T522 in FIG. 7, as a recipient. The terminal 10 may send the AReq one or more times to the printer 100 using one or more of the communication channels listed or represented in the channel list L2, which is obtained at T522. The AReq includes the public key TPK4, of the terminal 10, generated at T600, the encrypted data ED3 generated at T602, and capability information of the terminal 10. The capability information includes a value representing that the terminal 10 operates as a Configurator.

At T610, the printer 100 receives the AReq from the terminal 10 via the Wi-Fi I/F 116. The AReq is sent to the MAC address (e.g., "macpr") of the printer 100 as a recipient, so that the printer 100 may receive the AReq appropriately. The AReq is sent to the printer 100 using (e.g., sequentially) one or more of the communication channels (which are usable by the printer 100) in the channel list L2, so that the printer 100 may receive the AReq appropriately.

Subsequently, the printer 100 executes T612 and T614 for authenticating the sender (e.g., the terminal 10) of the AReq. Steps T612 and T614 are similar to T212 and T214 in FIG. 4, respectively, except for the data (e.g., keys and encrypted data) to be used. At T612, the printer 100 generates a shared key SK3 using the public key TPK4 and the private key psk1. At T614, the printer 100 decrypts the encrypted data ED3 in the AReq using the shared key SK3. If the decryption of the encrypted data ED3 is successful, the printer 100 determines that the authentication of the sender (e.g., the terminal 10) of the AReq is successful, and executes T616 and its subsequent steps.

At T616, the printer 100 generates a public key PPK2 and a private key psk2 thereof. In another embodiment, the public key PPK2 and the private key psk2 may be pre-stored in the memory 134. Subsequent steps T617 and T618 are similar to T217 and T218 in FIG. 4, respectively, except for the data (e.g., keys and encrypted data) to be used. At T617, the printer 100 generates a shared key SK4 using the public key TPK4 and the private key psk2. At T618, the printer 100 encrypts random values RV3 and RV4 using the shared key SK4 and generates encrypted data ED4.

At T620, the printer 100 sends an ARes to the terminal 10 via the Wi-Fi I/F 116. The ARes includes the public key PPK2, of the printer 100, generated at T616, the encrypted data ED4 generated at T618, and capability information of the printer 100. The capability information includes a value representing that the printer 100 operates as an Enrollee.

Steps T622-T634 are similar to T222-T234 in FIG. 4, except that a device to be communicated at T630 is the printer 100, and different keys and data (e.g., the public key PPK2, the encrypted data ED4, the private key tsk4, the shared key S4 and the random values RV3 and RV4) are used at T622 or T624. The Confirm message at T630 includes information representing that the terminal 10 operates as a Configurator and the printer 100 operates as an Enrollee, so that the terminal 10 determines, at T632, that the terminal 10 operates as a Configurator, and the printer 100 determines, at T634, that the printer 100 operates as an Enrollee. Upon completion of T634, the Authentication with the printer 100 in FIG. 8 ends. After ending the processes in FIG. 8, the terminal 10 discards the public key TPK4 and the private key tsk4 (e.g., deletes the keys from the memory 34).

(Configuration with Printer 100; FIG. 9)

Referring to FIG. 9, the Configuration process, at T65 in FIG. 2, between the terminal 10 and the printer 100 will now be described.

At T700, the printer 100 sends a CReq to the terminal 10 via the Wi-Fi I/F 116. The CReq is a signal for requesting the terminal 10 to send a printer configuration object.

At T700, the terminal 10 receives the CReq from the printer 100, via the Wi-Fi IF 16. Based on receiving the CReq from the printer 100, the terminal 10 obtains, at T702, the public key TPK2 and the private key tsk2 thereof from the memory 34. In one example, the terminal 10 obtains, from the memory 34, the terminal configuration object that includes the group ID (e.g., "home"), which has the same character string as selected at T504 in FIG. 7. In the state in FIG. 7 prior to the execution of T500, the terminal configuration object includes the public key TPK2. Accordingly, the terminal 10 can obtain the public key TPK2 that is included in the terminal configuration object. The terminal 10 can obtain, from the memory 34, the private key tsk2 corresponding to the public key TPK2.

At T704, the terminal 10 generates a printer configuration object. Step T704 is similar to S304 in FIG. 5 except for the data (e.g., keys) to be used. The printer configuration object includes a printer signed-connector and the public key TPK2 obtained at T702. The printer signed-connector includes the hash value HV, the group ID (e.g., "home"), the public key PPK2 of the printer 100, and a digital signature DSpr. The digital signature DSpr is information including a third value that is encrypted by the private key tsk2 obtained at T702. The third value is obtained by performing a hash function of a combination of the hash value HV, the group ID (e.g., "home"), and the public key PPK2.

When the terminal 10 establishes a Wi-Fi connection with AP 6 at T25 in FIG. 2, the terminal 10 has stored, in the memory 34, the MAC address (e.g., "macap") of the AP 6, which is obtained at T122 in FIG. 3, and channel information (e.g., frequency or channel number) indicating a communication channel to be used for establishing the Wi-Fi connection with AP 6. At T710, the terminal 10 sends to the printer 100, via the Wi-Fi I/F 16, a CRes including the printer configuration object generated at T704, as well as the MAC address (e.g., "macap") of the AP 6 and the channel information that have been stored in the memory 34.

At T710, the printer 100 receives the CRes from the terminal 10 via the Wi-Fi I/F 116. Based on receiving the CRes from the terminal 10, the printer 100 stores, at T712, in the memory 134, the printer configuration object, the MAC address (e.g., "macap"), and the channel information that are included in the CRes. Upon completion of T712, the Configuration process with the printer 100 in FIG. 9 ends.

(Network Access Between Printer 100 and AP 6; FIG. 10)

Referring to FIG. 10, the Network Access process, at T70 in FIG. 2, between the printer 100 and the AP 6 will now be described. In a state in FIG. 10 prior to an execution of T810, the printer 100 has stored the public keys PPK1 and PPK2, the private keys psk1 and psk2, and the printer configuration object, and the AP 6 has stored the public keys APK1 and APK2, the private keys ask1 and ask2, and the AP configuration object.

At T810, the printer 100 sends, via the Wi-Fi I/F 116, a DReq including the printer signed-connector, to the AP 6, e.g., to the MAC address "macap", which is stored at T712 in FIG. 9, as a recipient. The DReq is sent using the communication channel represented in the channel information stored at T712.

At T810, the AP 6 receives the DReq from the printer 100. As described above, the DReq is sent to the MAC address (e.g., "macap") of the AP 6 as a recipient, so that the AP 6 may receive the DReq from the printer 100 appropriately. If a Wi-Fi connection has been established between the terminal 10 and the AP 6 using a particular communication channel, the AP 6 may not be able to communicate with another device using a communication channel different from the particular communication channel. In the illustrative embodiment, as described above, the DReq is sent from the printer 100 to the AP 6 using the communication channel represented in the channel information, so that the AP 6 may receive the DReq from the printer 100 appropriately.

Based on receiving the DReq from the printer 100 at T810, the AP 6 executes an authentication process for authenticating the sender (e.g., the printer 100) of the DReq, and information in the DReq (e.g., the hash value HV, the group ID "home", and the public key PPK2). Step T812 is similar to T412 in FIG. 6 except for the data (e.g., keys) to be used. In other words, the AP 6 determines that the hash value HV and the group ID (e.g., "home") in the printer signed-connector respectively match the hash value HV and the group ID (e.g., "home") in the AP signed-connector. In short, the AP 6 determines that the authentication of the sender (e.g., the printer 100) of the DReq is successful. The AP 6 decrypts the digital signature DSpr in the printer signed-connector, using the public key TPK2, of the terminal 10, that is included in the AP configuration object, thereby obtaining the third value. The AP 6 determines that the third value matches a value obtained by performing a hash function of the information in the printer signed-connector (e.g., the hash value HV, the group ID "home", and the public key PPK2). In other words, the AP 6 determines that the authentication of the information in the DReq is successful.

Steps T814 and T820 are similar to T414 and T420 in FIG. 6, respectively, except that a device to be communicated at T820 is the printer 100 and different keys (e.g., the public key PPK2 of the printer 100 and the connector key CK2) are used at T814. Based on receiving the DRes from the AP 6 via Wi-Fi I/F 116 at T820, the printer 100 executes, at T822, an authentication process for authenticating the sender (e.g., the AP 6) of the DRes and information in the DRes (e.g., the hash value HV, the group ID "home", and the public key APK2). Step T822 is similar to T422 in FIG. 6, except that the printer 100 executes T822 and different data (e.g., keys) are used at T822. In other words, the printer 100 determines that the hash value HV and the group ID "home" in the AP signed-connector respectively match the hash value HV and the group ID "home" in the printer signed-connector. In short, the printer 100 determines that the authentication of the sender (e.g., the AP 6) of DRes is successful. The printer 100 decrypts the digital signature DSap in the AP signed-connector, using the public key TPK2, of the terminal 10, included in the printer configuration object, thereby obtaining the first value. The printer 100 determines that the first value matches a value obtained by performing a hash function of the information in the AP signed-connector (e.g., the hash value HV, the group ID "home", and the public key APK2). In other words, the printer 100 determines that the authentication of the information in the DRes is successful.

At T824, the printer 100 generates a connector key CK2 based on the ECDH, using the private key psk2 of the printer 100 and the public key APK2 of the AP 6 in the AP signed-connector. The connector key CK2 generated by the printer 100 at T824 is the same as the connector key CK2 generated by the AP 6 at T814. The connector key CK2 is thus shared between the printer 100 and the AP 6 to establish a Wi-Fi connection therebetween. Upon completion of T824, the Network Access between the printer 100 and the AP 6 ends.

As described above, the connector key CK2 is shared between the printer 100 and the AP 6. Subsequently, the printer 100 and the AP 6 execute, at T75 in FIG. 2, a four-way handshake using the connector key CK2, and a Wi-Fi connection is established between the printer 100 and the AP 6. The printer 100 establishes a Wi-Fi connection with the AP 6 using the communication channel represented in the channel information stored at T712 in FIG. 9. If a Wi-Fi connection has been established between the terminal 10 and the AP 6 using a particular communication channel, the printer 100 also uses the same communication channel as the particular communication channel, so that the printer 100 may establish a Wi-Fi connection appropriately with the AP 6.

As described above, the printer 100 receives, at T610 in FIG. 8, the AReq from the terminal 10, using one of the communication channels included in the channel list L2 of the printer 100. In other words, the printer 100 receives the AReq from the terminal 10, using the communication channel usable by both of the printer 100 and the terminal 10. At T75 in FIG. 2, the printer 100 establishes a Wi-Fi connection with the AP 6 using a communication channel represented in the channel information. In other words, the printer 100 establishes a Wi-Fi connection with the AP 6 using a communication channel usable by both of the printer 100 and the AP 6. A communication channel usable by the terminal 10 may be different from a communication channel usable by the AP 6. In an illustrative embodiment, a communication channel used by the printer 100 to receive the AReq from the terminal 10 at T610 in FIG. 8 is different from a communication channel used by printer 100 to establish a Wi-Fi connection with the AP 6 at T75 in FIG. 2.

In another embodiment, the communication channel used by the printer 100 to receive the AReq from the terminal 10 at T610 may be the same as the communication channel used by printer 100 to establish a Wi-Fi connection with the AP 6 at T75.

(Connection Confirming Processes to be Executed by Devices 6, 10, and 100; FIG. 11)

Referring to FIG. 11, processes to be performed by the respective devices 6, 10, and 100 subsequent to the processes in FIG. 10 will now be described.

Based on sending the CRes to the printer 100 at T710 in FIG. 9, the terminal 10 starts sending, at T900, via the Wi-Fi I/F 16, a query request repeatedly to the printer 100, e.g., the MAC address "macpr" as a recipient. The MAC address "macpr" is obtained at T522 in FIG. 7. The query request is a signal for querying the printer 100 as to whether the printer 100 has established a Wi-Fi connection with the AP 6. The query request is transmitted at the data link layer of the OSI model.

If the printer 100 receives, via the Wi-Fi I/F 116, the query request from the terminal 10 prior to establishing a Wi-Fi connection with the AP 6, the printer 100 may not send, to the terminal 10, a response to the query request. The response may be referred to as a "query response". At T910 (or T75 in FIG. 2), the printer 100 establishes a Wi-Fi connection with the AP 6. Subsequently, if the printer 100 receives, via the Wi-Fi I/F 116, the query request from the terminal 10, the printer 100 sends, via the Wi-Fi I/F 116, the query response to the terminal 10.

Based on receiving the query response from the printer 100 via the Wi-Fi I/F 16 at T912, the terminal 10 executes a confirmation process for confirming whether the terminal 10 can communicate with the printer 100 via the AP 6. The confirmation process will be described below in conjunction with example cases A and B. A confirmation request, which will be described below, includes a first request signal and a second request signal. A confirmation response, which will be described below, includes a first response signal and a second response signal.

Example Case A

In the example case A, a Wi-Fi connection is established at T910 between the printer 100 and the AP 6 in a state in which a Wi-Fi connection, which has been established between the terminal 10 and the AP 6 (at T25 in FIG. 2), is not disconnected.

At T920, the terminal 10 sends out a first request signal, via the Wi-Fi I/F 16, by broadcasting to all possible destinations including the AP 6, so that all of the child stations that have been established a Wi-Fi connection with the AP 6 may receive the first request signal. Consequently, the printer 100 receives, at T922, the first request signal from the AP 6, via the Wi-Fi I/F 116. At 924, the printer 100 sends a first response signal to the AP 6, via the Wi-Fi I/F 116. The first response signal includes the MAC address (e.g., "macpr") and the IP address of the printer 100.

At T924, the AP 6 receives the first response signal from the printer 100. The AP 6 also receives first response signals from the child stations other than the printer 100. At T926, the AP 6 sends, to the terminal 10, the first response signals sent from the respective child stations.

At T926, the terminal 10 receives the first response signals from the AP 6 via the Wi-Fi I/F 16. The terminal 10 determines whether any one of the first response signals includes the MAC address (e.g., "macpr") of the printer 100 that is obtained at T522 in FIG. 7. In the example case A, one of the first response signals includes the MAC address "macpr", so that the terminal 10 determines that communication can be performed with the printer 100, via the AP 6. Subsequently, the terminal 10 obtains an IP address of the printer 100 from the first response signal. The first request signal and the first response signal may be transmitted, for example, using an address resolution protocol ("ARP") at the data link layer of the OSI model.

The terminal 10 sends a second request signal, via the AP 6, to the IP address of the printer 100 as a recipient (at T920 and T922). The terminal 10 receives a second response signal from the printer 100 via the AP 6 (at T924 and T926). The second request signal and the second response signal may be ping communications that use the Internet Control Message Protocol (ICMP) in the network layer of the OSI model. The terminal 10 confirms that the communication can be performed with the printer 100 at the network layer of the OSI model.

At T930 (or T80 in FIG. 2), the terminal 10 sends print data whose recipient is the IP address of the printer 100, to the AP 6, via the Wi-Fi I/F 16. At T932 (or T85 in FIG. 2), the AP 6 sends the print data to the printer 100. The print data represents an image to be printed. The print data may be data representing an image to be used for test printing by the printer 100 or a particular image designated by a user.

At T932, the printer 100 receives, via the Wi-Fi I/F 116, the print data from the terminal 10 through the AP 6. At 940, the printer 100 forwards the print data to the print execution unit 118 and causes the print execution unit 118 to execute printing based on the print data (refer to T90 in FIG. 2). Upon completion of T940, the connection confirming processes in the example case A end.

Example Case B

In the example case B, the Wi-Fi connection established (at T25 in FIG. 2) between the terminal 10 and the AP 6 has been disconnected, which may occur, for example, when the terminal 10 is turned off. After the terminal 10 is turned on again, T55-T70 in FIG. 2 are executed between the terminal 10 and the printer 100 and between the printer 100 and the AP 6. At T910 in FIG. 11, a Wi-Fi connection is established between the printer 100 and the AP 6. But, in this example case B, the Wi-Fi connection between the terminal 10 and AP 6 is still disconnected.

In this example case B, based on receiving the query response from the printer 100 via the Wi-Fi I/F 16 at T912, the terminal 10 broadcasts, at T960, a confirmation request (e.g., a first request signal), to the AP 6 via the Wi-Fi I/F 16. Because the Wi-Fi connection is disconnected between the terminal 10 and the AP 6, the terminal 10 fails to send the confirmation request to the AP 6 and to receive a confirmation response (e.g., a first response signal) from the printer 100. Accordingly, because the terminal 10 does not receive the confirmation response, the terminal 10 can understand that a Wi-Fi connection between the terminal 10 and the AP 6 is disconnected.

Once the terminal 10 understands that the Wi-Fi connection with the AP 6 is disconnected, the terminal 10 executes a four-way handshake with the AP 6 at T970, using the connector key CK1 (generated at T424 in FIG. 6) in the memory 34, thereby re-establishing a Wi-Fi connection with the AP 6. The terminal 10 thus establishes the Wi-Fi connection with the AP 6. The printer 100 has also established the Wi-Fi connection with the AP 6. In short, all of the devices 6, 10, and 100 are on the same network. Subsequent to T970, steps T920-T940 may be executed as performed in the example case A.

Advantageous Effects of Illustrative Embodiments

In the illustrative embodiments, the private key tsk2 used for generating the digital signature DSap (for the AP 6), which is included in the AP configuration object, may be the same as the private key tsk2 used for generating the digital signature DSpr (for the printer 100), which is included in the printer configuration object. The AP 6 uses the AP configuration object, in order to establish a Wi-Fi connection between the terminal 10 and the AP 6 (at T25 in FIG. 2). The printer 100 uses the printer configuration object, in order to establish a Wi-Fi connection between the printer 100 and the AP 6 (at T75 in FIG. 2). The Wi-Fi connection may be established appropriately between the terminal 10 and the AP 6 and between the printer 100 and the AP 6.

In the illustrative embodiments, the printer 100 receives, from the terminal 10, the printer configuration object, the channel information representing a communication channel (e.g., frequency) to be used for establishing a Wi-Fi connection between the terminal 10 and the AP 6, and the MAC address (e.g., "macap") of the AP 6 (at T710 in FIG. 9). Using the MAC address (e.g., "macap") and the communication channel represented in the channel information, the printer 100 may appropriately establish a Wi-Fi connection with the AP 6. The Wi-Fi connection can thus be established appropriately between the terminal 10 and the AP 6 and between the printer 100 and the AP 6.

(Correspondence)

The terminal 10 is an example of a "terminal device". The printer 100 is an example of a "communication device". The AP 6 is an example of an "external device". The Wi-Fi I/F 16 is an example of a "wireless interface" of the "terminal device". The CPU 32 is an example of a "processor" of the "terminal device". The app 38 is an example of a "computer program" for the "terminal device". The private key tsk2 of the terminal 10 is an example of a "private key". The AP configuration object is an example of "first connection information". The Wi-Fi connection at T25 in FIG. 2 is an example of a "first wireless connection". The first value, which is obtained by performing a hash function of a combination of the hash value HV, the group ID (e.g., "home"), and the public key APK2 that are included in the AP configuration object, is an example of "information obtained using at least a piece of information included in the first connection information". The public key PPK1 of the printer 100 is an example of a "first public key". The AReq at T610 in FIG. 8 is an example of a "first authentication request". The ARes at T620 in FIG. 8 is an example of a "first authentication response". The printer configuration object is an example of "second connection information". The third value, which is obtained by performing a hash function of a combination of the hash value HV, the group ID (e.g., "home"), and the public key PPK2 that are included in the printer configuration object, is an example of "information obtained using at least a piece of information included in the second connection information". The Wi-Fi connection at T75 in FIG. 2 (or T910 in FIG. 11) is an example of a "second wireless connection".

The group ID (e.g., "home") is an example of "related information". The character string "New" in the selection screen at T502 in FIG. 7 is an example of "particular information". The MAC address (e.g., "macap") of the AP 6 is an example of "device identification information". The terminal configuration object is an example of "third connection information". The second value, which is obtained by performing a hash function of a combination of the hash value HV, the group ID (e.g., "home"), and the public key TPK3 that are included in the terminal configuration object, is an example of "information obtained using at least a piece of information included in the third connection information". The public key APK1 of the AP 6 is an example of a "second public key". The AReq at T210 in FIG. 4 is an example of a "second authentication request". The ARes at T220 in FIG. 4 is an example of a "second authentication response". The hash value HV included in the printer configuration object is an example of "authentication information". The AP signed-connector is an example of "information that is sent from the external device to the communication device". The QR code displayed at T512 in FIG. 7 is an example of a "coded image".

The Wi-Fi I/F 116 is an example of a "wireless interface" of the "communication device". The AReq at T610 in FIG. 8 is an example of an "authentication request". The ARes at T620 in FIG. 8 is an example of an "authentication response". The printer configuration object is an example of "connection information". The channel information and the MAC address (e.g., "macap") of the AP 6 are examples of "specific information". The communication channel used at T610 in FIG. 8 is an example of a "first communication channel". The communication channel used at T75 in FIG. 2 is an example of a "second communication channel".

Step T522 in FIG. 7 is an example of a process that is executed by a "first obtaining unit" of the "terminal device". Step T610 in FIG. 8 is an example of a process that is executed by a "first authentication request sender" of the "terminal device". Step T620 in FIG. 8 is an example of a process that is executed by a "first authentication response receiver" of the "terminal device". Step T704 in FIG. 9 is an example of a process that is executed by a "first generator" of the "terminal device". Step T710 in FIG. 9 is an example of a process that is executed by a "first information sender" of the "terminal device". Step T610 in FIG. 8 is an example of a process that is executed by an "authentication request receiver" of the "communication device". Step T620 is an example of a process that is executed by an "authentication response sender" of the "communication device". Step T710 in FIG. 9 is an example of a process that is executed by an "information receiver" of the "communication device". Steps T810, T822 and T824 in FIG. 10 and step T75 in FIG. 2 are examples of processes that are executed by an "establishing unit" of the "communication device"

While aspects are described in detail with reference to specific embodiments thereof, those are merely examples, and various changes, arrangements and modifications may be made therein without departing from the spirit and scope of the disclosure. Modifications to the illustrative embodiments are given below.

(Modification 1) In the illustrative embodiments, a digital signature (e.g., DSpr) is generated by encrypting a particular value, which is obtained by performing a hash function of a combination of the hash value HV, the group ID (e.g., "home"), and a public key (e.g., APK2), using the private key tsk2. In another embodiment, the digital signature may be generated by encrypting the combination of the hash value HV, the group ID (e.g., "home"), and the public key, using the private key tsk2. In this modification, the combination of the hash value HV, the group ID, and a public key that are included in a signed-connector (e.g., the AP signed-connector) is an example of "at least a piece of information included in the first (or second or third) connection information", and is an example of "information obtained using at least a piece of information included in the first (or second or third) connection information".

(Modification 2) The terminal 10 may not necessarily cause the display 14 to display the selection screen at T102 in FIGS. 3 and T502 in FIG. 7. In this modification, if the app 38 starts up at T100 in FIG. 3 in a state in which the terminal 10 does not store the terminal configuration object, the terminal 10 may skip T102 and T104 and execute T106. If the app 38 starts up a t T500 in FIG. 7 in a state in which the terminal 10 has stored the terminal configuration object, the terminal 10 may skip T502 and T504 and execute T506. In this modification, the "terminal device" may not necessarily include a "display controller".

(Modification 3) In FIG. 11, T920-T926 and T960 may be omitted. In this modification, the "terminal device" may not necessarily include a "confirmation request sender" or a "confirmation response receiver", and the "communication device" may not necessarily include a "confirmation request receiver" or a "confirmation response sender".

(Modification 4) In FIG. 11, T970 may be omitted. In this modification, the "terminal device" may not necessarily include a "re-establishing unit".

(Modification 5) In FIGS. 11, T930 and T932 may be omitted. In this modification, the "terminal device" may not necessarily include a "print data sender". The "communication device" may not necessarily include a "print execution unit", a "print data receiver", or a "print controller".

(Modification 6) At T912 in FIG. 11, the printer 100 may send, to the terminal 10, a query response including the IP address of the printer 100. In this modification, at T920 and T922, the terminal 10 may send a confirmation request (e.g., a unicast confirmation request) including the IP address of the printer 100, to the printer 100, via the AP 6. The confirmation request may be transmitted at, for example, the data link layer of the OSI model. Step T920 that is performed in this modification is an example of a process that is executed by the "confirmation request sender" of the "terminal device".

(Modification 7) In FIGS. 11, T900 and T912 may be omitted. In this modification, based on sending the CRes to the printer 100 at T710 in FIG. 9, the terminal 10 may repeatedly send a confirmation request to the AP 6 at T920. In this modification, the "terminal device" may not necessarily include a "query request sender" or a "query response receiver", and the "communication device" may not necessarily include a "query request receiver" or a "query response sender".

(Modification 8) In some embodiments, the OS 36, as opposed to the app 38, may execute T122 in FIG. 3 through T424 in FIG. 6 (and T25 in FIG. 2). In other words, the "computer program" for the "terminal device" may not necessarily cause the "computer" to function as a "second generator", the "establishing unit", a "second obtaining unit", a "second authentication request sender", a "third generator", or a "second information sender".

(Modification 9) At T512 in FIG. 7, the printer 100 may print an image including a QR code, on a recording medium (e.g., sheet of paper), instead of displaying a QR code in the printer 100. In this modification, printing a QR code is an example of "outputting the coded image".

(Modification 10) Examples of the "communication device" may include devices, other than the printer 100, such as a scanner, a multi-function device, a mobile terminal, a PC, and a server. Examples of the "external device" may include devices, other than the AP 6, such as a printer, a scanner, a mobile terminal, a PC, and a server.

(Modification 11) At T710 in FIG. 9, the terminal 10 may send, to the printer 100, a CRes including the printer configuration object, and the channel information, but not including the MAC address (e.g., "macap") of the AP 6. In this modification, the printer 100 may broadcast a DReq at T810 in FIG. 10, using the communication channel represented in the channel information. Alternatively, at T710, the terminal 10 may send to the printer 100, a CRes including the printer configuration object and the MAC address (e.g., "macap") of the AP 6, but not including the channel information. In this case, at T810, the printer 100 may send a DReq to the AP 6, e.g., to the MAC address "macap" as a recipient, using (e.g., sequentially) one or more of the communication channels usable by the printer 100. In other words, the "specific information" may include at least one of the "channel information" and the "device identification information".

(Modification 12) The terminal 10 may execute T55 and T60, prior to executing T5-T25 in FIG. 2, with the AP 6. In this modification, the terminal 10 may execute, subsequent to T60, steps T5-25 with the AP6, and then T65 with the printer 100.

(Modification 13) The "device identification information" may not be limited to the MAC address (e.g., "macap") of the AP 6, but may include an IP address or a device name of the AP 6.

(Modification 14) A shared key (e.g., SK1) may be generated (e.g., at T201 in FIG. 4), based on the ECDH, in a manner different from the illustrative embodiments. A shared key may be generated based on a method, e.g., Diffie-Hellman key exchange ("DH"), other than the ECDH. In the illustrative embodiments, a digital signature (e.g., DSap) is generated based on the ECDSA. In another embodiment, a digital signature may be generated based on, for example, Digital Signature Algorithm ("DSA") or Rivest-Shamir-Adleman cryptosystem ("RAS").

(Modification 15) The QR code displayed in the printer 100 at T512 in FIG. 7 may be a coded image that is not obtained by encoding the channel list L2 and the MAC address "macpr". In other words, a QR code may be a coded image that is obtained by encoding at least the public key PPK1. In this modification, based on receiving an operation for displaying the QR code at T510, the printer 100 may monitor the reception of the AReq that is sent using one of the communication channels, which are usable by the printer 100. At T610 in FIG. 8, the terminal 10 may broadcast the AReq, using (e.g., sequentially) all of the communication channels which are usable by the terminal 10. In short, a coded image may be an image that is obtained by encoding at least the "first public key".

(Modification 16) In FIGS. 7, T510 and T512 may be omitted. In this modification, a QR code that is obtained by encoding the public key PPK1, the channel list L2, and the MAC address "macpr", may be attached to a casing of the printer 100. In this modification, the "communication device" may not necessarily include an "output controller".

(Modification 17) "DRAFT Device Provisioning Protocol Technical Specification Version 0.2.11" released by Wi-Fi Alliance, states that a shared code, key, phrase, or word is referred to as a "code". Accordingly, at T512 in FIG. 7, the printer 100 may display, instead of a QR code, an image including a shared code, key, phrase, or word that is obtained by encoding the public key PPK1, the channel list L2, and the MAC address "macpr", in the display 114.

(Modification 18) In the illustrative embodiments, processes in FIGS. 2-11 are performed by the CPU 32 of the terminal 10 that executes the programs 36 and 38 (e.g., software) and/or the CPU 132 of the printer 100 that executes the programs 136 (e.g., software). Alternatively, at least one of the processes in FIGS. 2-11 may be executed by hardware, e.g., a logical circuit.

The technical elements described in the specification or the drawings may exhibit technical usefulness, either alone or in combination, and combinations are not limited to those described in the claims as filed. The techniques illustrated in the specification or the drawings may achieve a plurality of objectives at the same time, and achieving only one of them has technical usefulness.

What is claimed is:

1. One or more non-transitory computer-readable media storing instructions that, when executed by one or more processors, cause a terminal device to:
    obtain a first public key of a communication device;
    send, to the communication device via a wireless interface of the terminal device, a first authentication request generated using the first public key;
    receive, from the communication device via the wireless interface, a first authentication response responsive to the first authentication request;
    after the first authentication response is received from the communication device, generate connection information for establishing a second wireless connection between the communication device and an external device different from the communication device; and
    send the connection information and specific information to the communication device via the wireless interface, wherein the specific information comprises at least one of: channel information indicating a communication channel used in a first wireless connection between the terminal device and the external device, or device identification information identifying the external device, and the second wireless connection between the communication device and the external device is established by the communication device using the connection information and the specific information.

2. The one or more non-transitory computer-readable media as in claim 1, wherein the instructions, when executed by the one or more processors, further cause the terminal device to:
    after sending the connection information and the specific information to the communication device, send, to the communication device via the wireless interface and via the external device, a confirmation request in a case where the first wireless connection is established between the terminal device and the external device and the second wireless connection is established between the communication device and the external device; and
    receive, from the communication device via the wireless interface and via the external device, a confirmation response responsive to the confirmation request.

3. The one or more non-transitory computer-readable media as in claim 1, wherein the communication device is a printer configured to execute a printing function, and
    wherein the instructions, when executed by the one or more processors, further cause the terminal device to,
    after sending the connection information and the specific information to the communication device, send, to the communication device via the wireless interface and via the external device, print data representing an image to be printed.

4. The one or more non-transitory computer-readable media as in claim 3, wherein the instructions, when executed by the one or more processors, further cause the terminal device to:
    prior to sending the print data, send, to the communication device via the wireless interface and not via the external device, a query request to query whether the second wireless connection has been established; and
    after sending the query request to the communication device and establishing the second wireless connection between the communication device and the external device, receive, from the communication device via the wireless interface and not via the external device, a query response responsive to the query request.

5. The one or more non-transitory computer-readable media as in claim 1, wherein the connection information and the specific information are sent to the communication device as a Configurator conforming to a Wi-Fi standard.

6. The one or more non-transitory computer-readable media as in claim 1, wherein the connection information comprises authentication information, and
    wherein the authentication information is used by the communication device for authenticating information that is sent from the external device to the communication device, and
    in a case where the authentication of the information succeeds, the second wireless connection between the communication device and the external device is established.

7. The one or more non-transitory computer-readable media as in claim 1, wherein the first public key is obtained by scanning a coded image, and
    wherein the coded image is outputted by the communication device, and is generated by encoding the first public key.

8. The one or more non-transitory computer-readable media as in claim 1, wherein the first authentication request is sent to the communication device using a first communication channel,
    the specific information comprises the channel information indicating a second communication channel used in the first wireless connection,
    the second wireless connection is established between the communication device and the external device using the second communication channel indicated by the channel information, and
    the second communication channel is different from the first communication channel.

* * * * *